United States Patent
Koga et al.

(10) Patent No.: US 8,450,240 B2
(45) Date of Patent: May 28, 2013

(54) REVERSIBLE THERMOSENSITIVE RECORDING MEDIUM AND METHOD FOR PRODUCING THE SAME

(75) Inventors: Noboru Koga, Tokyo (JP); Tadafumi Tatewaki, Shizuoka (JP); Takeshi Owashi, Shizuoka (JP); Koji Yamaguchi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 407 days.

(21) Appl. No.: 12/797,036

(22) Filed: Jun. 9, 2010

(65) Prior Publication Data

US 2010/0311579 A1    Dec. 9, 2010

(30) Foreign Application Priority Data

Jun. 9, 2009 (JP) .................. 2009-138694
Dec. 28, 2009 (JP) .................. 2009-298258

(51) Int. Cl.
*B41M 5/30* (2006.01)
*B41M 5/42* (2006.01)

(52) U.S. Cl.
USPC .............. 503/201; 235/488; 283/83; 428/137

(58) Field of Classification Search
None
See application file for complete search history.

(56) References Cited

U.S. PATENT DOCUMENTS

| | | | |
|---|---|---|---|
| 5,468,711 A | 11/1995 | Suzuki et al. | |
| 2007/0063058 A1 | 3/2007 | Iwakata et al. | |
| 2009/0170699 A1 | 7/2009 | Tatewaki et al. | |
| 2011/0224073 A1* | 9/2011 | Owashi et al. | 503/200 |
| 2012/0208697 A1* | 8/2012 | Yamaguchi et al. | 503/201 |

FOREIGN PATENT DOCUMENTS

| | | |
|---|---|---|
| CA | 2348461 A1 | 5/2001 |
| CN | 1932858 A | 3/2007 |
| DE | 19850353 C1 | 3/2000 |
| EP | 1764727 A1 | 3/2007 |
| JP | 2-252593 | 10/1990 |
| JP | 8-142552 | 6/1996 |
| JP | 11-11060 | 1/1999 |
| JP | 11-59037 | 3/1999 |
| JP | 11-85938 | 3/1999 |
| JP | 11-91274 | 4/1999 |
| JP | 11-154210 | 6/1999 |
| JP | 2000-71661 | 3/2000 |
| JP | 2000-94866 | 4/2000 |
| JP | 2000-251042 | 9/2000 |

(Continued)

OTHER PUBLICATIONS

Sep. 7, 2011 Chinese official action (with English translation) in connection with a counterpart Chinese patent application.

(Continued)

*Primary Examiner* — Bruce H Hess
(74) *Attorney, Agent, or Firm* — Cooper & Dunham LLP

(57) ABSTRACT

A reversible thermosensitive recording medium including a reversible thermosensitive recording layer, a first sheet-shaped base provided adjacent to the reversible thermosensitive recording layer, an electronic information recording module containing a module substrate, and a convex-shaped electronic information recording element and an antenna circuit both disposed on the module substrate, and a first resin layer for bonding the first sheet-shaped base and the electronic information recording module, wherein the first sheet-shaped base has a concave portion on a surface opposite to a surface on which the reversible thermosensitive recording layer is formed, and the electronic information recording element is inserted into the concave portion of the first sheet-shaped base.

20 Claims, 21 Drawing Sheets

FOREIGN PATENT DOCUMENTS

| | | |
|---|---|---|
| JP | 2000-276576 | 10/2000 |
| JP | 2001-63228 | 3/2001 |
| JP | 2001-175832 | 6/2001 |
| JP | 2002-103654 | 4/2002 |
| JP | 2002-304613 | 10/2002 |
| JP | 2003-141486 | 5/2003 |
| JP | 2003-141494 | 5/2003 |
| JP | 2004-192568 | 7/2004 |
| JP | 2005-250578 | 9/2005 |
| JP | 2005-354110 | 12/2005 |
| JP | 2006-344207 | 12/2006 |
| JP | 2007-177351 | 7/2007 |
| JP | 2008-162077 | 7/2008 |
| JP | 2008-229911 | 10/2008 |
| JP | 4269450 | 3/2009 |
| JP | 2009-173013 | 8/2009 |
| WO | WO2004/008397 A1 | 1/2004 |
| WO | WO 2006/030785 A1 | 3/2006 |

OTHER PUBLICATIONS

Nov. 19, 2010 European search report in connection with European patent application No. EP 10 16 5269.

\* cited by examiner

733

REVERSIBLE THERMOSENSITIVE RECORDING MEDIUM AND METHOD FOR PRODUCING THE SAME

BACKGROUND OF THE INVENTION

1. Field of the Invention

The present invention relates to a reversible thermosensitive recording medium including an electronic information recording module having an antenna circuit, and a method for producing the reversible thermosensitive recording medium.

2. Description of the Related Art

IC cards have been increasingly being used in various aspects from users' daily lives to business activities. Actually, they are used as various cards (e.g., cash cards, credit cards, prepaid cards and ETC cards (electronic toll collection system)); in transportation facilities (e.g., railways and buses); as affiliate cards for digital broadcasting, 3rd generation mobile phones, etc.; in library service counters; and as student ID cards, employee ID cards, basic resident register cards, etc. Meanwhile, the amount of IC cards disposed of has been being increasing in accordance with diversification of the current economic and social activities.

In view of this, there is a keen need to create a recycling society, where material consumption is reduced and less environmental load is given, by reconsidering the current economic societies and lifestyles involving mass production, mass consumption and mass disposal to promote effective utilization and recycling of materials.

As one promising measure, electronic information recording module-embedded reversible thermosensitive recording media, wherein the electronic information recording module includes an electronic information recording element (hereinafter may be referred to as an "IC chip") and an antenna circuit, can be used for reducing the amount of products disposed of. This is because they can rewrite information stored in the IC chip and show information as a visible image on their surface.

Such electronic information recording module-embedded reversible thermosensitive recording media have been used in the manufacturing industry as instruction sheets such as operation sheets, parts management sheets and process management sheets. Actually, there is repeatedly performed a cycle including winding an instruction sheet around a rod-like part or inserting it into a card case, and rewriting the content of the instruction sheet.

When an image is formed on or erased from it, a heating device (e.g., thermal head, erase bar, erase roller and erase plate) of the printer is pressed against the instruction sheet. Thus, rewriting of the instruction sheet must be performed so as not to break the electronic information recording module and not to avoid outflow of an adhesive from an adhesion portion between the electronic information recording module and the reversible thermosensitive recording medium. Furthermore, desirably, the instruction sheet is flexible and shows a high-quality image.

Moreover, a tag may be bent when the tag placed on a table surface is picked up, and a tag is taken out from a tag holder in an outer frame on a box. Thus, an IC chip portion in the tag is demanded to have mechanical durability against bending. Additionally, a medium is made thinner and flexible so as to improve efficiency of operation, such as picking up the medium. Namely, when the tag is picked up by hands upon operation, it is demanded that the tag is easily handled by flexibly changing its shape without locally bending its shape and breaking.

Moreover, as the tag is fed to a printer for image formation and erasure immediately after being held, it is also demanded that the tag is recovered from a shape varied upon holding to a flat shape at high speed, so as to reduce feeding failure and jam caused by curling or surface waviness in the printer.

Moreover, it is demanded that a printer is filled with tags as many as possible so as to decrease the number of access to the printer and shorten operation time, to thereby decrease the number of operation in the field.

Furthermore, from the viewpoint of improvement of close-contact properties with a thermal head so as to obtain high quality image, it is important to make a medium thin and flexible.

Such electronic information recording module-embedded reversible thermosensitive recording media each include an IC chip having a relatively large convex shape, and an antenna circuit having a relatively small concavo-convex shape.

If the surface of the reversible thermosensitive recording medium has concavo-convex portions and unevenness, a thermal head insufficiently comes into contact with a surface of the reversible thermosensitive recording medium and thus, heat is not sufficiently conducted in the surface thereof due to the heat insulating effect of air. As a result, the reversible thermosensitive recording medium cannot be rapidly cooled, causing failure in color development (unprinted image portion etc.) and a desired color development cannot be obtained in a part which is hard to be rapidly cooled.

For example, conventionally as shown in FIG. 15 proposed are IC cards including, as an over sheet, a reversible thermosensitive recording sheet 114 having at least one reversible thermosensitive layer 114c containing an intrinsically colorless or light-colored leuco dye and a reversible color developer allowing the leuco dye to develop color through application of heat and to erase the developed color through next application of heat, and including, as the other over sheet (film base 111) in which an IC card having an IC chip module (electronic information recording element) 112 is embedded, wherein a core member 113 is formed between these two over sheets through injection molding so that these are thermally bonded via the core member 113 to each other (Japanese Patent Application Laid-Open (JP-A) Nos. 11-154210, 2000-94866, 2000-251042, 2001-63228 and 2002-103654).

In FIG. 15, 114a denotes a protective layer and 114b denotes an intermediate layer.

In the above-described IC cards, the IC chip module 112 is provided so as to face the reversible thermosensitive recording sheet 114 and thus, the reversible thermosensitive recording medium is ununiformly pressed due to the IC chip module 112, whereby concavo-convex portions are undesirably formed on the recording medium. The reversible thermosensitive recording medium having the concavo-convex portions cannot be uniformly heated using a heating device and thus, heat cannot be uniformly conducted in the reversible thermosensitive recording medium when image formation is performed. As a result, an uneven image is formed on the reversible thermosensitive recording medium. Also, when image erasure is performed, a heating device is ununiformly pressed against the reversible thermosensitive recording medium, leading to failure in image erasure. Furthermore, the reversible thermosensitive recording medium has, on the surface thereof, a convex portion corresponding to the IC chip module 112. As a result, a heating device is pressed via the reversible thermosensitive recording medium against the IC chip module 112, causing a problem in that the IC chip module 112 is damaged or peeled off from the reversible thermosensitive recording medium.

In view of this, for example, JP-A Nos. 11-91274, 11-59037, 11-85938, 2003-141486 and 2003-141494 discloses countermeasures against the above problems. IC chip module-embedded reversible thermosensitive recording media disclosed in these Patent Literatures, however, have low flexibility and high rigidity, i.e., large thickness and high hardness.

JP-A Nos. 2005-250578 and 2006-344207, therefore, disclose reversible thermosensitive recording media in which an IC chip module is provided on an IC chip substrate disposed over a reversible thermosensitive recording sheet so that the IC chip module does not face the reversible thermosensitive recording sheet.

However, on the surface of an electronic information recording module having an electronic information recording element, an antenna circuit and a conductive member (hereinafter the electronic information recording module may be referred to as an "inlet"), concavo-convex portions are formed not only by the electronic information recording element but also by the antenna circuit and the conductive member. In this antenna circuit, a conductive member connects a front face of the antenna circuit board, in which surface an antenna circuit is formed, to a back face thereof to form a jumping circuit. When these front and back faces are penetrated using a laser, etc. for conduction, so-called caulking portions are formed. These caulking portions and the conductive member formed on the back face form concavo-convex portions on the electronic information recording sheet. Thus, as described above, even if only the IC chip is provided on the IC chip substrate over the reversible thermosensitive recording sheet so that the IC chip does not face the recording sheet, concavo-convex portions are formed on the reversible thermosensitive recording sheet. In particular, JP-A No. 2006-344207 describes that an antenna circuit board has, on its back face, an electrically short-circuited jumper wire. However, also when the jumper wire is formed on the reversible thermosensitive recording sheet side, the reversible thermosensitive recording medium problematically involves failures in image formation and erasure.

In order to solve the above-described problems, the applicant of the present invention has previously filed JP-A Nos. 2008-162077 and 2008-229911. In these Patent Literatures, an electronic information recording element is housed in a through hole of a core sheet so as not to project the electronic information recording element from the sheet; and a surface of the reversible thermosensitive recording sheet, on which surface no reversible thermosensitive recording layer is provided, is made to face a surface of the electronic information recording sheet, on which surface none of an antenna circuit board, an electronic information recording element, antenna circuit and a conductive member is provided, to thereby reduce concavo-convex portions on the surface of the reversible thermosensitive cording medium.

However, the electronic information recording element projects into a through hole, so as to avoid forming a convex shape on the surface of the reversible thermosensitive recording medium due to the electronic information recording element portion. The minute concavo-convex portions, such as the antenna circuit on the electronic information recording sheet cause concavo-convex portions on the surface of the reversible thermosensitive recording medium when the medium is repeatedly used, leading to failure in color development.

In the reversible thermosensitive recording media having such a configuration, failure in image formation/erasure can be overcome when the transfer speed of a printer used is 2 IPS. However, when the reversible thermosensitive recording media undergo image erasure/formation at high speed (3 IPS or higher), a rewritten image cannot be improved in its qualities (i.e., involves image fading and incomplete erasure) in an area corresponding to the electronic information recording sheet (including areas each corresponding to an IC chip, an antenna circuit and a conductive member), leading to failure in color development.

Conventionally, the improvement in qualities has been achieved on a rewritten image area in an electronic information recording sheet at a transfer speed of 2 IPS. When image erasure and formation is performed at a transfer speed of 3 IPS, a rewritten image has not been improved in its qualities.

This is because the higher the transfer speed of the printer, the more difficult it is that heat applied from the erasure head of the printer is conducted in the reversible thermosensitive recording medium. In order to improve such state, when a temperature for image erasure is increased for improving erasability, the reversible thermosensitive recording medium is excessively heated by the erasure head. In this state, when image formation is performed, the reversible thermosensitive recording medium cannot be rapidly cooled to prevent color development (to be in an erasure mode). Consequently, when the electronic information recording module has, on a surface thereof, height differences and concavo-convex portions (i.e., the electronic information recording sheet does not have a flat surface and has concavo-convex portions in which the height from the top surface to the base portion is about 50 μm and which are formed by the IC chip, the antenna circuit, and the caulking portion connecting the antenna circuit to the IC chip), a thermal head insufficiently comes into contact with a surface of the reversible thermosensitive recording medium and thus, heat is not sufficiently conducted in the surface thereof due to the heat insulating effect of air. As a result, the reversible thermosensitive recording medium cannot be rapidly cooled, causing failure in color development.

Meanwhile, the reversible thermosensitive recording medium used in the field of logistics, and image erasure and formation at a high speed (a transfer speed used in a printer is 3 IPS or higher) is demanded for cost reduction such as shortening of an operation time.

Under such circumstances, demand has arisen for a high-quality electronic information recording element-embedded reversible thermosensitive recording medium in which, even when image erasure and formation is performed at a high speed of 3 IPS or higher, white voids and image fading do not occur in the formed image areas each corresponding to the surrounding area of the electronic information recording sheet, to the electronic information recording element, to the antenna circuit and to the conductive member; image erasure can be completely performed.

Moreover, it is demanded that a tag is easily handled by flexibly changing its shape without locally bending its shape and breaking according to the shape variation upon holding. Moreover, as the tag is fed to a printer for image formation and erasure immediately after being held, it is also demanded that the tag is recovered from a shape varied upon holding to a flat shape at high speed, so as to reduce feeding failure and jam caused by curling or surface waviness in the printer. Furthermore, when a large number of the reversible thermosensitive recording media are stacked and print at once, it is demanded that a printer is filled with tags as many as possible so as to decrease the number of access to the printer and shorten operation time, to thereby decrease the number of operation in the field.

Moreover, proposed is a reversible thermosensitive recording medium including a sheet having a through-hole into which an electronic information recording element is inserted, and a sheet having a hollowed-out portion for housing an electronic information recording sheet between a reversible thermosensitive recording sheet and a sheet facing a surface of the reversible thermosensitive recording sheet (see JP-A No. 2009-173013).

According to this proposal, the electronic information recording element is housed in the through-hole of the sheet so as not to project the electronic information recording element from the sheet and the electronic information recording sheet is housed in the hollowed-out portion of the sheet, so that the reversible thermosensitive recording medium can be made flat without forming unevenness and concavo-convex portions caused by an antenna circuit of the electronic information recording sheet, and thus an occurrence of an unprinted image portion can be reduced to some extend.

However, as sheets for respectively compensating for the unevenness of the electronic information recording element and concavo-convex portions of the antenna circuit are provided inside of the medium, the reversible thermosensitive recording medium becomes thicker, adversely affecting flexibility.

As a proposal for a module for an IC card, such structure is proposed that the module has a substrate and an IC chip mounted on the substrate, wherein a protective member for covering the IC chip is bonded to the substrate, and between the protective member and the IC chip a gap is formed to prevent the protective member from directly contacting with the IC chip. Moreover, the protective member is a plate-shaped or sheet-shaped protective cap having a concave portion on its surface, in which the IC chip is housed with a gap left between them (see JP-A No. 11-11060).

However, in this case, concavo-convex portions of the antenna circuit in the electronic information recording sheet is not considered. If this structure is employed in a reversible thermosensitive recording medium for repetitive image formation and erasure, the concavo-convex portions may be formed on a surface of the reversible thermosensitive recording medium, causing failure in color development.

BRIEF SUMMARY OF THE INVENTION

The present invention solves the conventional problems and achieved the following objects.

An object of the present invention is to provide a high-quality reversible thermosensitive recording medium in which, even when image erasure and formation is performed at a high speed of 3 IPS or higher, white voids and image fading do not occur in the formed image areas each corresponding to the surrounding area of the electronic information recording sheet, to the electronic information recording element, to the antenna circuit and to the conductive member; image erasure can be completely performed; and no lamination displacement occurs.

Another object of the present invention is to provide a reversible thermosensitive recording medium, which is thin and has excellent flexibility while maintaining high bending durability and contact pressure resistance, and causes neither failure in color development after repetitive image formation and erasure nor initial failure in color development upon performing image formation once, and to provide a method for producing the reversible thermosensitive recording medium.

To solve the above described problems, the inventors of the present invention have been intensively studied and attain the following findings.

A heating member, such as a thermal head in a reversible thermosensitive recording printer for IC cards, RF tags, etc., usually has a contact surface, which is flat in the width direction and round in the traveling direction. Additionally, a base for media, such as IC cards, RF tags, etc., is demanded to have flatness having less curling, surface unevenness. Because a roller-shaped heating member is brought into contact with a thermosensitive member by pressure in a uniform manner, so as to apply heat on the medium and to uniformly distribute temperature therein. To achieve the flatness, many media, which are stiff enough to prevent occurrence of curling and waviness, have been commercialized.

Contrary to the idea of increasing stiffness of the media, the inventors of the present invention have found a structure of the medium, in which quality of color development and erasure is not impaired regardless of the print at high speed or shape accuracy of a thermal head.

Namely, the total thickness of the reversible thermosensitive recording medium is decreased by half, so that the entire reversible thermosensitive recording medium becomes flexible, and a surface of the reversible thermosensitive recording medium which will be brought into contact with a thermal head for reversible thermosensitive recording in the driving state is made flexible. Thus, the reversible thermosensitive recording medium uniformly comes into contact with the thermal head while the medium is transferred for image formation and erasure at high speed using the thermal head.

Moreover, the inventors of the present invention attain the following findings.

Surface unevenness or waviness is 110 μm or less does not usually influence on qualities of image formation and erasure. However, when it is visually observed from the direction where a shade of unevenness is easily observed by setting a back light in oblique back direction of the medium, concavo-convex portions of a first resin layer provided between stiff bases may be reflected to a surface of a reversible thermosensitive recording layer.

By removing a base layer of the reversible thermosensitive recording medium, stress generated due to a shape thereof is released to a surface opposite to a surface on which the reversible thermosensitive recording layer is formed, and unevenness of the surface on which the reversible thermosensitive recording layer conforms with the flatness of the base, to thereby eliminate visually unnecessary concavo-convex portions.

In a multilayer film or a film bonded with a release liner, curling easily occurs due to stress remaining in materials or difference in thermal contraction after film formation. The curling is caused by difference in tensions between a front base and a back base upon bonding them, difference in expansion and contraction of the bases is influenced by temperature and humidity. In order to prevent these causes, it is necessary to adjust tension in production and to change curling properties by setting temperature in a casting device.

However, the total thickness of the reversible thermosensitive recording medium is decreased by half, so that the entire reversible thermosensitive recording medium becomes flexible, and a surface of the reversible thermosensitive recording medium which will be brought into contact with a thermal head for reversible thermosensitive recording in the driving state is made flexible. As a result, even though curling occurs due to the unbalanced properties between the front base and the back base, when the release paper is removed, the medium conforms with the flatness of one base. The medium is settled in flat without forming curling. Moreover, the curling is caused by moisture absorption even in the case of a single body. By using an adhesive layer having high air permeability on a back surface, the humidity influences equally on the front surface and the back surface, so as to prevent curling and easily obtain flatness.

By improving flexibility of the medium, the base is flexible against bending, and functions to prevent a caulking portion of IC from concentrated bending or bending at acute angel, to thereby reduce load on the caulking portion of IC.

Moreover, in the case where the tag placed on a table surface is picked up, and a tag is taken out from a tag holder in an outer frame on a box, the tag changes its shape according to the shape variation upon holding, to thereby obtain excellent handling.

Means for solving the above problems pertinent in the art are as follows:

<1> A reversible thermosensitive recording medium including: a reversible thermosensitive recording layer; a first sheet-shaped base provided adjacent to the reversible thermosensitive recording layer; an electronic information recording module containing a module substrate, and a convex-shaped electronic information recording element and an antenna circuit both disposed on the module substrate; and a first resin layer for bonding the first sheet-shaped base and the electronic information recording module, wherein the first sheet-shaped base has a concave portion on a surface opposite to a surface on which the reversible thermosensitive recording layer is formed, and the electronic information recording element is inserted into the concave portion of the first sheet-shaped base.

<2> The reversible thermosensitive recording medium according to <1>, wherein in the width direction of the concave portion the distance between a side surface of the concave portion and a side surface of the electronic information recording element is 6.0 mm or less.

<3> The reversible thermosensitive recording medium according to any one of <1> and <2>, wherein in the depth direction of the concave portion the distance between the bottom of the concave portion and the top of the electronic information recording element is 0 µm to 50 µm.

<4> The reversible thermosensitive recording medium according to any one of <1> to <3>, further including one or more functional layers provided on a side of the reversible thermosensitive recording medium opposite to the side where the reversible thermosensitive recording layer is provided, via the first sheet-shaped base and the first resin layer.

<5> The reversible thermosensitive recording medium according to any one of <1> to <4>, further including: a second sheet-shaped base provided on a surface of the reversible thermosensitive recording medium opposite to a surface thereof on which the reversible thermosensitive recording layer of the first sheet-shaped base is formed; and a second resin layer for bonding the second sheet-shaped base and the first sheet-shaped base, wherein the electronic information recording module is provided between the first sheet-shaped base and the second sheet-shaped base, wherein the electronic information recording element is inserted into the concave portion of the first sheet-shaped base so as to leave a gap between the electronic information recording element and the concave portion of the first sheet-shaped base in the depth direction of the concave portion, and wherein the first resin layer is provided so as to adjust the shortest distance between the antenna circuit and the first sheet-shaped base to 10 µm or more.

<6> The reversible thermosensitive recording medium according to any one of <1> to <5>, wherein the first resin layer has a thickness of 100 µm or less.

<7> The reversible thermosensitive recording medium according to any one of <1> to <6>, wherein the first resin layer has an elastic modulus larger than that of the second resin layer.

<8> The reversible thermosensitive recording medium according to any one of <1> to <7>, further including a third resin layer formed in a gap between the concave portion and the electronic information recording element.

<9> The reversible thermosensitive recording medium according to <8>, wherein a material for forming the first resin layer and a material for forming the third resin layer are the same resin.

<10> The reversible thermosensitive recording medium according to any one of <8> to <9>, wherein the third resin layer has an elastic modulus smaller than those of the first sheet-shaped base and the second sheet-shaped base.

<11> The reversible thermosensitive recording medium according to any one of <8> to <10>, wherein the elastic modulus of the third resin layer is 700 MPa to 1,500 MPa.

<12> The reversible thermosensitive recording medium according to any one of <1> to <11>, wherein the first resin layer is formed so as to cover an entire surface opposite to a surface on which the electronic information recording element of the electronic information recording module is provided, and the reversible thermosensitive recording medium has a uniform thickness.

<13> The reversible thermosensitive recording medium according to any one of <1> to <12>, wherein the first resin layer is applied for bonding at a temperature of 60° C. to 90° C., and a viscosity of $1\times10^5$ CPS or less.

<14> The reversible thermosensitive recording medium according to any one of <1> to <13>, wherein the layer which is present at a side of the reversible thermosensitive recording medium opposite to the reversible thermosensitive recording layer via the first sheet-shaped base and is exposed contains an antistatic agent.

<15> The reversible thermosensitive recording medium according to any one of <1> to <14>, wherein the first resin layer contains an antistatic conductive filler.

<16> The reversible thermosensitive recording medium according to any one of <1> to <15>, wherein the concave portion has a depth of 150 µm or less, and in the width direction of the concave portion the distance between the side surface of the concave portion and the side surface of the electronic information recording element is 1.5 mm or less.

<17> The reversible thermosensitive recording medium according to any one of <1> to <16>, wherein the concave portion has a depth of 110 µm or less, and in the width direction of the concave portion the distance between the side surface of the concave portion and the side surface of the electronic information recording element is 6.0 mm or less.

<18> The reversible thermosensitive recording medium according to any one of <1> to <17>, wherein the layer, which is present at a side of the reversible thermosensitive recording medium opposite to the reversible thermosensitive recording layer and is exposed, has a surface roughness of 7 µm to 70 µm, where the surface roughness is the maximum in-plane height $R_{max}$.

<19> The reversible thermosensitive recording medium according to any one of <1> to <18>, wherein the reversible thermosensitive recording medium has a total thickness of 500 µm or less.

<20> The reversible thermosensitive recording medium according to any one of <1> to <19>, wherein the reversible thermosensitive recording medium has a load for bending deformation of 28 gf or less, where the load for bending deformation indicates flexibility of the reversible thermosensitive recording medium.

<21> A method for producing a reversible thermosensitive recording medium, including: forming a reversible thermosensitive recording layer on a surface of a first sheet-shaped base; forming a concave portion on a surface of the first sheet-shaped base opposite to the surface thereof on which the reversible thermosensitive recording layer is formed, forming a first resin layer on the surface of the first sheet-shaped base on which the concave portion is formed; and bonding the first sheet-shaped base and an electronic information recording module containing a module substrate, and a convex-shaped electronic information recording element and an antenna circuit both disposed on the module substrate via the first resin layer so as to insert and locate the electronic information recording element into the concave portion.

<22> The method for producing a reversible thermosensitive recording medium according to <21>, wherein the forming a first resin layer includes adjusting the shortest distance between the antenna circuit and the first sheet-shaped base to 10 μm or more, and the boding the first sheet-shaped base and an electronic information recording module includes inserting the electronic information recording element into the concave portion so as to leave a gap between the electronic information recording element and the concave portion of the first sheet-shaped base in the depth direction of the concave portion, and wherein the method further includes: forming a second resin layer on a surface of a second sheet-shaped base; and bonding the second sheet-shaped base to the first sheet-shaped base and the electronic information recording module via the second resin layer.

<23> The method for producing the reversible thermosensitive recording medium according to any one of <21> and <22>, wherein the boding the first sheet-shaped base and an electronic information recording module includes forming a third resin layer in the concave portion so as to bond the concave portion and the electronic information recording element to be inserted thereinto via the third resin layer.

<24> The method for producing the reversible thermosensitive recording medium according to any one of <22> to <23>, wherein a material for forming the first resin layer and a material for forming the second resin layer are the same resin.

<25> The method for producing the reversible thermosensitive recording medium according to any one of <23> and <24>, wherein a material for forming the first resin layer and a material for forming the third resin layer are the same resin.

<26> The method for producing the reversible thermosensitive recording medium according to any one of <21> to <25>, wherein the forming a concave portion is performed by any of a cutting process, a laser process, a press process and an etching process.

The present invention can provide a high-quality reversible thermosensitive recording medium in which, even when image erasure and formation is performed at a high speed of 3 IPS or higher, white voids and image fading do not occur in the formed image areas each corresponding to the surrounding area of the electronic information recording sheet, to the electronic information recording element, to the antenna circuit and to the conductive member; image erasure can be completely performed; and no lamination displacement occurs. Moreover, the present invention can provide a reversible thermosensitive recording medium, which is thin and has excellent flexibility while maintaining high bending durability and contact pressure resistance, and causes neither failure in color development after repetitive image formation and erasure nor initial failure in color development upon performing image formation once, and provide a method for producing the reversible thermosensitive recording medium.

DETAILED DESCRIPTION OF THE INVENTION

Figure 1A:
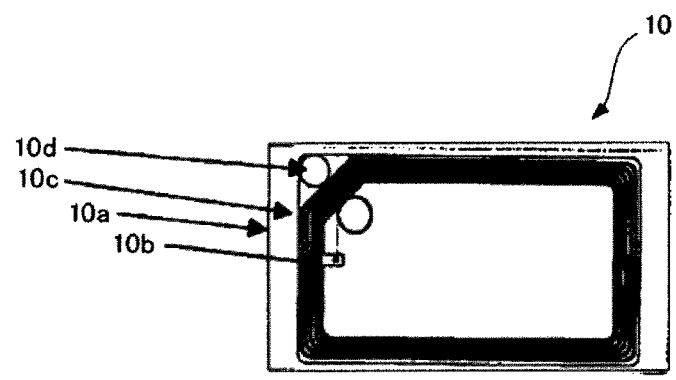
FIG. 1A is a plan view showing an example of an electronic information recording module.

A reversible thermosensitive recording medium of the present invention includes at least a reversible thermosensitive recording layer, a first sheet-shaped base, an electronic information recording module, and a first resin layer, and if necessary further includes a second sheet-shaped base, a second resin layer, a third resin layer, a functional layer having an arbitrary function, and other layers.

—Reversible Thermosensitive Recording Layer—

The reversible thermosensitive recording layer reversibly changes in color tone and contains a reversible thermosensitive recording material reversibly changing in color depending on change in temperature. The reversible thermosensitive recording material changes in color as a result of changing in, for example, light transmittance, light reflectance, light absorption wavelength and light scattering degree.

The reversible thermosensitive recording material is not particularly limited, so long as it can reversibly change in transparency or color tone by heat, and can be appropriately selected depending on the purpose. Examples of the reversible thermosensitive recording material include those which turn into a first color at a first temperature higher than ambient temperature and turn into a second color after heating at a second temperature higher than the first temperature and then cooling. The reversible thermosensitive recording material which turns into another color at first and second temperatures is particularly preferable.

Specific examples include a material which becomes transparent at a first temperature and becomes opaque at a second temperature (see JP-A No. 55-154198), a material which develops color at a second temperature and becomes colorless at a first temperature (see JP-A Nos. 04-224996, 04-247985 and 04-267190), a material which becomes opaque at a first temperature and becomes transparent at a second temperature (see JP-A No. 03-169590), and a material which turns into black, red, blue, etc. at a first temperature and becomes colorless at a second temperature (see JP-A Nos. 02-188293 and 02-188294). Particularly preferred are dispersions of an organic low-molecular-weight material (e.g., higher fatty acids) in a base resin; and mixtures of a leuco dye and a color developer.

The leuco dye is not particularly limited and can be appropriately selected depending on the purpose. Examples of the leuco dye include phthalide compounds, azaphthalide compounds and fluoran compounds. These may be used alone or in combination.

The color developer is not particularly limited and can be appropriately selected depending on the purpose. Examples of the color developer include those disclosed in, for example, JP-A Nos. 05-124360, 06-210954 and 10-95175. These may be used alone or in combination.

The color developer is a compound having, in the molecule thereof, at least one structure allowing a leuco dye to develop color (e.g., a phenolic hydroxyl group, carboxylic acid group and phosphoric acid group) and at least one structure controlling an intermolecular force (e.g., a structure containing a long chain hydrocarbon group). These structures may be linked to each other via a di- or more-valent linking group containing a hetero atom. Also, the long chain hydrocarbon group may have such a linking group and/or an aromatic group.

Examples of such a color developer include those disclosed in, for example, JP-A Nos. 09-290563 and 11-188969. Among them, preferred are compounds represented by the following General Formulas (1) and (2). These color developers have much higher sensitivity than conventional color developers and thus, energy applied for image formation can be reduced by about 10% to about 30%. In this case, thermal decomposition of the color developer can be reduced, and less damage is given to the reversible thermosensitive recording medium and the surface thereof. As a result, durability after repetitive use does not degrade, maintaining excellent image quality.

General Formula (1)

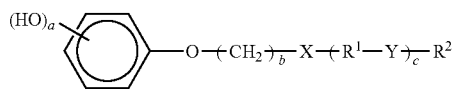

In General Formula (1), X and Y each represent a hetero atom-containing divalent organic group, $R^1$ represents a substituted or unsubstituted divalent hydrocarbon group, $R^2$ represents a substituted or unsubstituted monovalent hydrocarbon group, a is an integer of 1 to 3, b is an integer of 1 to 20, and c is an integer of 0 to 3.

General Formula (2)

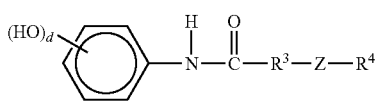

In General Formula (2), Z represents a hetero atom-containing divalent organic group, $R^3$ represents a substituted or unsubstituted divalent hydrocarbon group, $R^4$ represents a substituted or unsubstituted monovalent hydrocarbon group, and d is an integer of 1 to 3.

In General Formulas (1) and (2), as described above, each of X, Y and Z represents a hetero atom-containing divalent organic group, and particularly preferably represents a nitrogen or oxygen atom-containing divalent organic group; e.g., divalent organic groups containing at least one selected from the groups having the following structural formulas.

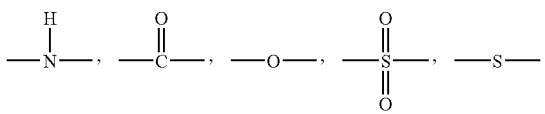

Preferred examples of the hetero atom-containing divalent organic group include those having the following structural formulas.

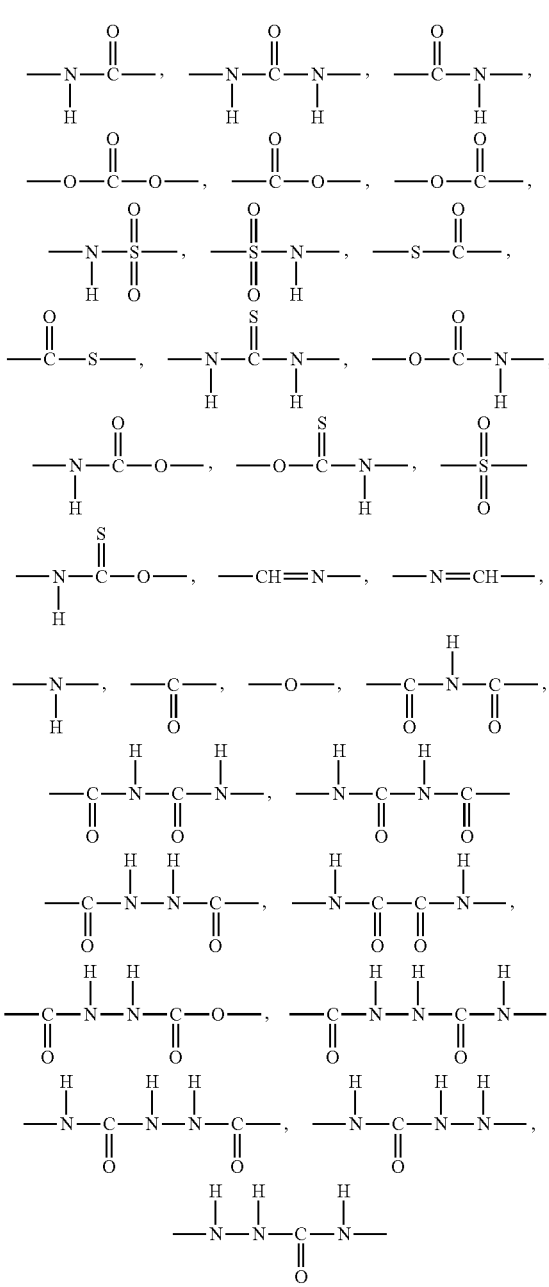

Of these, particularly preferred are those having the following structural formulas.

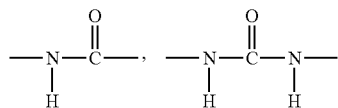

In General Formulas (1) and (2), each of $R^1$ and $R^3$ represents a substituted or unsubstituted divalent hydrocarbon group having 1 to 20 carbon atoms.

Preferred groups represented by $R^1$ or $R^3$ are those represented by the following structural formulas:

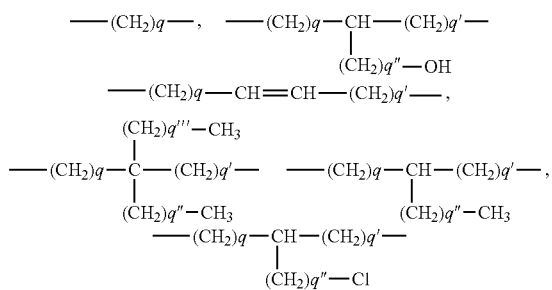

where each of q, q', q" and q''' is an integer satisfying the conditions: the total number of carbon atoms contained in the groups represented by $R^1$ or $R^3$ is 1 to 20. Among them, groups represented by —$(CH_2)_q$— are particularly preferred.

In General Formulas (1) and (2), each of $R^2$ and $R^4$ represents a substituted or unsubstituted aliphatic hydrocarbon group having 1 to 24 carbon atoms, preferably 8 to 18 carbon atoms.

The aliphatic hydrocarbon group may be linear or branched, and may have an unsaturated bond. Examples of the substituent linked to the hydrocarbon group include a hydroxyl group, halogen atom and alkoxy group. When the total number of carbon atoms contained in groups $R^1$ and $R^2$ or groups $R^3$ and $R^4$ is 7 or less, stable color development or color erasure deteriorates. Thus, the total number is preferably 8 or more, more preferably 11 or more.

Preferred groups represented by $R^2$ or $R^4$ are those represented by the following structural formulas:

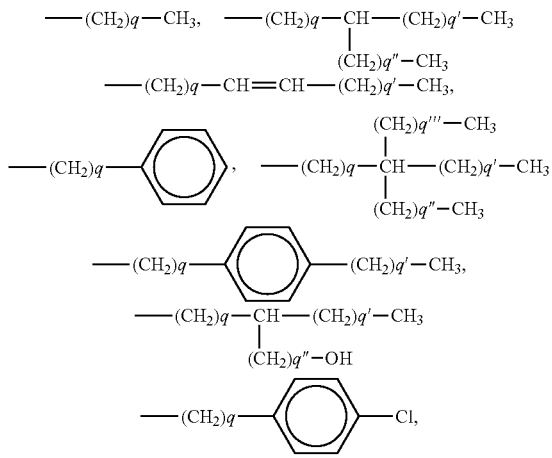

where each of q, q', q" and q''' is an integer satisfying the conditions: the total number of carbon atoms contained in the groups represented by $R^2$ or $R^4$ is 1 to 24. Among them, groups represented by —$(CH_2)_q$—$CH_3$ are particularly preferred.

If necessary, the reversible thermosensitive recording layer may contain an additive for improving and/or controlling coating property of a coating liquid therefor and color developability/erasability thereof. Examples of the additive include surfactants, conductivity-imparting agents, fillers, antioxidants, color development stabilizers and color erasure promoter.

The reversible thermosensitive recording layer preferably contains a leuco dye, a color developer and an additive together with a binder resin. The binder resin is not particularly limited, so long as it can bond the leuco dye, the color developer and the additive onto the first sheet-shaped base. Preferred examples of the binder resin include resins curable using heat, ultraviolet (UV) ray, electron beam (EB) for improving durability after repetitive use. Particularly preferred are thermally-curable resins using a curing agent. These resins can increase a gel ratio of the reversible thermosensitive recording layer.

The thermally-curable resin is not particularly limited and can be appropriately selected depending on the purpose. Examples of the thermally-curable resin include acryl polyol resins, polyester polyol resins, polyurethane polyol resins, polyvinyl butyral resins, cellulose acetate propionate and cellulose acetate butyrate.

The curing agent is not particularly limited and can be appropriately selected depending on the purpose. Preferably, isocyanates are used. Examples of the isocyanate include hexamethylene diisocyanate (HDI), tolylene diisocyanate (TDI), xylylene diisocyanate (XDI) and isophorone diisocyanate (IPDI); an adduct type, burette type, isocyanurate type formed between trimethylolpropane, etc. and the above isocyanates; and blocked products of the above isocyanates. Among them, preferred are hexamethylene diisocyanate, an adduct type thereof, a burette type thereof and an isocyanurate type thereof. Note that all the curing agent used do not participate in curing reaction. In other words, the reversible thermosensitive recording layer may contain an unreacted curing agent. Also, curing catalysts may be used for allowing curing reaction to successfully proceed.

The reversible thermosensitive recording layer preferably has a gel ratio of 30% or higher, more preferably 50% or higher, still more preferably 70% or higher. When the gel ratio is lower than 30%, the reversible thermosensitive recording layer may exhibit degraded durability after repetitive use.

Here, the gel ratio can be measured by immersing a coated film in a solvent having a high dissolution capability. Specifically, a reversible thermosensitive recording layer is peeled off from the first sheet-shaped base, followed by weighing (initial mass); and the thus-obtained reversible thermosensitive recording layer is sandwiched between 400-mesh wire gauzes and then immersed in a solvent capable of dissolving an uncured binder resin for 24 hours, followed by drying in vacuum and weighing (mass after drying). From the obtained values, the gel ratio can be calculated using the following Equation 1:

$$\text{Gel ratio (\%)} = (\text{mass after drying})/(\text{initial mass}) \times 100 \quad \text{<Equation 1>}$$

Notably, the mass of components other than the binder resin (e.g., particles of organic low-molecular-weight materials), which are contained in the reversible thermosensitive recording layer, is not taken into account for calculation. When the mass of particles of organic low-molecular-weight materials is not previously obtained, it may be calculated from a mass ratio of the binder resin to the particles of organic low-molecular-weight materials. The mass ratio can be determined based on their specific gravities and a ratio of an area occupied with the binder resin to that occupied with the particles of organic low-molecular-weight materials by observing a unit area of the cross section of the layer through transmission electron microscopy (TEM), scanning electron microscopy (SEM), etc.

In the reversible thermosensitive recording layer, a mass ratio of the binder to a color developer is preferably 0.1 to 10. When the mass ratio is less than 0.1, the formed reversible thermosensitive recording layer has insufficient heat resistance; whereas when the mass ratio is more than 10, the density of color developed may decrease.

The reversible thermosensitive recording layer can be formed through application of a coating liquid prepared by homogeneously dispersing, in a solvent, a leuco dye, a color developer, an additive and a binder resin.

Examples of the solvent include alcohols, ketones, ethers, glycol ethers, esters, aromatic hydrocarbons and aliphatic hydrocarbons.

The coating liquid can be prepared using a disperser such as a paint shaker, a ball mill, an attriter, a three-roll mill, a Kady mill, a sand mill, a Dino mill or a colloid mill. Here, the coating liquid may be prepared by dispersing the above materials in a solvent using a disperser or may be mixing dispersions of the above materials one another. Also, these materials are dissolved in a solvent under heating and then the solution is rapidly or slowly cooled for precipitation.

Examples of coating methods for forming the reversible thermosensitive recording layer include blade coating, wire bar coating, spray coating, air knife coating, bead coating, curtain coating, gravure coating, kiss coating, reverse roll coating, dip coating or die coating.

The thickness of the reversible thermosensitive recording layer is not particularly limited and can be appropriately selected depending on the purpose. It is preferably 1 µm to 20 µm, more preferably 3 µm to 15 µm. When the thickness is less than 1 µm, the density of color developed may decrease to degrade the contrast of the formed image. Whereas when the thickness is more than 20 µm, position-dependent variation in the amount of heat applied becomes large in the reversible thermosensitive recording layer. Some portions of the recording layer do not develop color since the temperature of the portions does not reach a color developing temperature, potentially resulting in failure to attain a desired color density.

—First Sheet-Shaped Base—

The first sheet-shaped base is provided adjacent to the reversible thermosensitive recording medium, and a concave portion is formed on a surface of the first sheet-shaped base opposite to a surface thereof on which the reversible thermosensitive recording layer is provided. The concave portion is formed so that a convex-shaped electronic information recording element (IC chip), which is provided on the electronic information recording module (inlet), can be inserted into the concave portion.

The shape, structure and size of the first sheet-shaped base are not particularly limited and can be appropriately selected depending on the intended purpose. The first sheet-shaped base has a quadrangular shape, a circular shape, etc. Also, the base sheet may have a single-layer structure, multi-layer structure, etc.

The first sheet-shaped base may be, for example, a resin sheet, a rubber sheet, a synthetic paper, a metal sheet, a glass sheet or a composite thereof. Among them, a resin sheet is particularly preferred.

Examples of the resin sheet include polyethylene terephthalate sheets, polycarbonate sheets, polystyrene sheets and polymethyl methacrylate sheets. These may be used alone or in combination. Among them, polyethylene terephthalate sheets are particularly preferred.

Alternatively, the first sheet-shaped base may be appropriately synthesized or may be a commercially available product.

The thickness of the first sheet-shaped base is determined in the light of the depth of a concavo portion because the concavo portion into which a convex-shaped electronic information recording module can be inserted, is formed thereon. It is preferably 20 µm to 300 µm, more preferably 50 µm to 188 µm.

—Concave Portion—

The shape of the concave portion is not particularly limited and can be appropriately selected depending on the purpose. It has preferably a depth of 20 µm to 260 µm.

When the concave portion has such shape, remarkably excellent printing quality can be obtained, without occurring white voids and image fading.

The distance between the concave portion and the electronic information recording element in the width direction of the concave portion is not particularly limited. When the depth of the concave portion is 150 µm, the distance between a side surface of the concave portion and a side surface of the electronic information recording element is preferably 0 mm to 1.5 mm, more preferably 0 mm to 1.0 mm, and particularly preferably 0 mm to 0.5 mm.

When the depth is more than 1.5 mm, white voids and image fading tend to occur, and the probability of occurring white voids and image fading gradually increases as the depth increases.

As another preferable embodiment, when the depth of the concave portion is 110 µm, the distance between the side surface of the concave portion and the side surface of the electronic information recording element is preferably 0 mm to 6.0 mm, more preferably 0 mm to 4.0 mm, and particularly preferably 0 mm to 2.0 mm.

When the distance is more than 6 mm, white voids and image fading tend to occur, and the probability of occurring white voids image fading gradually increases as the distance increases.

The distance between the concave portion and the electronic information recording element in the width direction of the concave portion means that a width of an air space portion formed in the concave portion in the state where the electronic information recording element is inserted in the concave portion.

The distance between the concave portion and the electronic information recording element in the depth direction of the concave portion is not particularly limited, but the distance from the bottom of the concave portion to the top of the electronic information recording element is preferably 0 µm to 50 µm, more preferably 5 µm to 50 µm, and particularly preferably 10 µm to 30 µm. In these ranges, occurrence of unprinted image portion can be prevented.

When the distance is less than 0 µm, the electronic information recording element projects to the side of the first sheet-shaped base, and an area surrounding the electronic information recording element may fail to develop color upon recording. When the distance is more than 50 µm, a concave shape is formed in the back surface due to the electronic information recording element, and an area surrounding the electronic information recording element may fail to develop color upon recording.

A method for producing the concave portion is not particularly limited and can be appropriately selected depending on the purpose. Any of a cutting process, a laser process, a press process and an etching process is preferably used. By the method for forming a concave portion, a concave portion having a desired dimension can be formed with high precision.

—Electronic Information Recording Module—

The electronic information recording module (hereinafter may be referred to as an "inlet") includes a module substrate, and a convex-shaped electronic information recording element (IC chip, IC package) and an antenna circuit both disposed on the module substrate and, if necessary, further includes a caulking portion, and other members.

When the reversible thermosensitive recording medium includes the second sheet-shaped base described below, the electronic information recording module is provided between the first sheet-shaped base and the second sheet-shaped base.

Figure 1B:
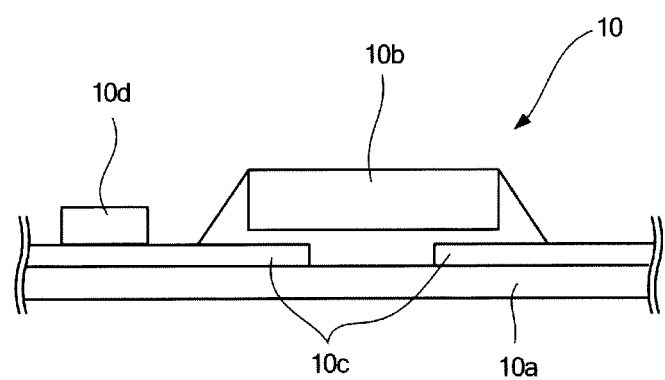
FIG. 1B is a side view showing an example of the electronic information recording module.

FIGS. 1A and 1B show an example of the electronic information recording module used in the present invention, and FIG. 1A is a plan view and 1B is a side view.

The electronic information recording module (inlet) 10 has a module substrate 10a (e.g., plastic film) and a coiled antenna circuit 10c formed thereon. This coiled antenna circuit forms an LC resonance circuit together with a capacity element, and can receive an electric wave having a predetermined frequency and send information stored in an electronic information recording element 10b to a source of the electric wave. In general, the communication frequency used may be appropriately selected from 125 kHz, 13.56 MHz, 2.45 GHz, 5.8 GHz (microwave) and the UHF band. Reference numeral 10d denotes a caulking portion.

The antenna circuit 10c is formed by etching a metal film laminated on the module substrate 10a, but not limited thereto. Examples thereof include a method by winding a coated electrical wire (e.g., enamel wire) on the antenna circuit board; and a method by printing conductive paste on the module substrate 10a. Alternatively, the antenna circuit 10c may be formed so as to be embedded in an antenna circuit board, or formed by metal foil as the antenna circuit is laminated.

The antenna circuit is not particularly limited, and usually the thickness of a wiring portion in the antenna circuit is 5 μm to 30 μm, and the antenna circuit has concavo-convex portions depending on the presence and absence of the wiring. Thus, it is necessary to reduce printing defect, such as white voids, image fading caused by the concavo-convex portions.

Examples of the base material for forming the module substrate 10a include rigid-type materials such as paper phenol, glass epoxy and composites; flexible-type materials such as polyimides, polyesters, polypropylenes, polyethylenes, polystyrenes, nylon, polyethylene terephthalate (PET), paper and synthetic paper; and complex-type materials of the rigid-type materials and the flexible-type materials. The thickness of the module substrate is not particularly limited.

It is preferably 15 μm to 360 μm, and more preferably 15 μm to 100 μm, from the viewpoints of improving the flexibility, operability and cost. Specifically, when the height of the electronic information recording element 10b is low, the reversible thermosensitive recording medium can be formed into thin, and when an inlet substrate and an antenna portion are thin, the first resin layer which covers the inlet substrate and the antenna portion can be formed into thin, to thereby make the reversible thermosensitive recording medium thin.

In the case where metal foil as the antenna circuit is laminated on the module substrate, the metal foil is not particularly limited. Examples of the metal foil laminated include a copper foil, aluminum foil, and an iron foil. Of these, from the viewpoints of cost and operability, an aluminum foil is preferred and the thickness is preferably 6 μm to 50 μm.

The shape of the module substrate is not particularly limited and may be any shapes such as square, rectangular, circular, ellipsoidal, etc.

The thickness (height) of the electronic information recording element 10b is not particularly limited and is preferably 200 μm or less, more preferably 25 μm to 140 μm. Also, a protective film (e.g., polyimide film, polyester film or paper) may be allowed to adhere to the electronic information recording element 10b for protection.

The thickness of the protective film is not particularly limited and is preferably 10 μm to 60 μm, and more preferably 1 μm to 20 μm.

Such a commercially available electronic information recording module 10 is not particularly limited and can be appropriately selected depending on the purpose. Examples thereof include inlet sheets available from, for example, UPM, OMRON, Alien Technology Corporation, Sony Corporation, FUJITSU LIMITED, Hitachi, Ltd. Texas Instruments Incorporated, Fujii Corporation, Dai Nippon Printing Co., Ltd., and TOPPAN PRINTING CO., LTD.

—First Resin Layer—

The first resin layer serves to bond the first sheet-shaped base and the electronic information recording module (inlet).

The adhesive used for the first resin layer is not particularly limited and can be appropriately selected depending on the purpose. Examples of the adhesive include urea resins, melamine resins, phenol resins, epoxy resins, vinyl acetate resins, vinyl acetate-acrylic copolymers, ethylene-vinyl acetate copolymers, acrylic resins, polyvinyl ether resins, vinyl chloride-vinyl acetate copolymers, polystyrene resins, polyester to resins, polyurethane resins, polyamide resins, chlorinated polyolefin resins, polyvinyl butyral resins, acrylic acid ester copolymers, methacrylic acid ester copolymers, natural rubbers, synthetic rubbers, cyanoacrylate resins, silicone resins, styrene-isoprene-styrene block copolymers and EVA resins.

Among them, preferred are natural rubbers, synthetic rubbers, acrylic resins, silicone resins, polyurethane resins, styrene-isoprene-styrene block copolymers and EVA resins, with acrylic resins being particularly preferred.

The thickness of the first resin layer is not particularly limited. Assuming that a thickness equal to the total height from the bottom surface of the base of the electronic information recording module to the plane of the antenna circuit (thickness of the antenna portion) is defined as +0 μm, the thickness of the first resin layer is preferably +0 μm to +150 μm, and more preferably +0 μm to +100 μm, and particularly preferably +0 μm to +60 μm.

When the thickness is less than the thickness of the antenna portion, the reversible thermosensitive recording medium has sufficiently uniform thickness, and printing quality is decreased.

As to the maximum thickness, for example, in the case where the first resin layer is adjusted to have a thickness thicker than the thickness of the antenna portion (100 μm) by more than 150 μm, to thereby obtain the total thickness of more than 250 μm, the first resin layer may be melted and outflow by thermal pressure by means of a thermal head when an image is formed on or erased from the reversible thermosensitive recording medium using a heating device.

The thickness of the first resin layer is preferably adjusted so that the shortest distance of the antenna circuit and the first sheet-shaped base becomes 10 μm or more.

When the shortest distance is less than 10 μm, the concavo-convex shape of the antenna circuit influences on image formation, causing failure in color development, such as white voids, image fading and the like upon image formation. From this standpoint, the shortest distance is more preferably 15 μm or more, and particularly preferably 20 μm or more.

When the shortest distance is 10 μm, the concavo-convex portions of the antenna circuit can be compensated for. However when the shortest distance increases, the total thickness of the reversible thermosensitive recording medium becomes thicker, and a desired flexibility may not be obtained. Therefore, the maximum shortest distance is preferably 50 μm or less.

As stated above, the wiring portion of the antenna circuit has concavo-convex portions and a thickness of 5 μm to 30 μm.

In the present invention, the shortest distance is defined as the distance between the first sheet-shaped base and the top surface of the wiring portion when they come the closest to each other.

The shortest distance can be measured in such a manner that the cross section near the wiring portion is polished, and the shape of the cross section is observed.

The thickness of the first resin layer is not particularly limited. From the standpoint of the shortest distance, it is preferably 100 μm or less, more preferably 50 μm or less, and particularly preferably 30 μm or less.

The thickness of the resin layer is more than 100 μm, the total thickness of the reversible thermosensitive recording medium increases, and a desired flexibility may not be obtained.

A method for forming the first resin layer is not particularly limited, and can be appropriately selected on the intended purpose. Examples thereof include spin coating, spray coating, laminator coating, and roll coating. From the viewpoint of forming uniform thickness, roll coating is preferably used.

A method for forming the first resin layer is not particularly limited. For example, the first resin layer is formed by applying a composition solution containing the adhesive, and then heating for adhesion.

When the first resin layer is formed by the method as described above, the coating and adhesion temperature is 60° C. to 90° C., and the viscosity is $1 \times 10^5$ CPS or less.

Namely, by decreasing the coating temperature and viscosity the curling amount of the reversible thermosensitive recording medium to be obtained can be suppressed, and the temperature of the first resin layer can be promptly decreased to a temperature at which the reversible thermosensitive recording medium can be cut in a desired size (approximately 60° C.) in the next step, to thereby significantly improve production efficiency.

Examples of the adhesive for forming such first resin layer include a PUR-HM adhesive, perfect lock MR900RI (hereinafter, simply referred to as PUR) produced by Henkel Technologies Japan Ltd.

The minimum value of the temperature is approximately 65° C., and minimum value of the viscosity is approximately $1 \times 10^5$ CPS. When each of these values is higher than 65° C. and $1 \times 10^5$ CPS, the first resin layer may not be sufficiently formed.

The first resin layer bonds the first sheet-shaped base and the electronic information recording module, and the first resin layer is preferably provided to cover the entire surface of the electronic information recording module opposite to a surface thereof on which the electronic information recording element is provided. In this case, the first resin layer is preferably formed as a uniform layer in which the shape of the electronic information recording module does not appear, and the thickness of the reversible thermosensitive recording medium can be preferably kept in a uniform manner.

In the case, the preferable embodiment is such that the medium having a base in one surface so as to have flexibility, and the electronic information recording module is coated with an adhesive having high fluidity, so as to form a layer for protecting the electronic information recording module in a uniform manner without containing foams. With this embodiment, excellent printing quality can be obtained.

In the case where the first resin layer is formed as an exposed layer, an antistatic conductive filler is preferably contained in the first resin layer.

The antistatic conductive filler is contained so as to prevent double feed in a printer due to sticking, and improve processing of stacking tags.

The antistatic conductive filler is not particularly limited, and examples thereof include an inorganic filler and an organic filler.

Examples of the inorganic filler include carbonates, silicates, metal oxides and sulfuric acid compounds.

Examples of the organic filler include silicone resins, cellulose resins, epoxy resins, nylon resins, phenol resins, polyurethane resins, urea resins, melamine resins, polyesters, polycarbonates, styrene resins, acrylic resins, polyethylenes, formaldehyde resins and polymethyl methacrylates.

—Functional Layer—

One or more functional layer is/are provided on a side of the reversible thermosensitive recording medium opposite to the side where the reversible thermosensitive recording layer is provided, via the first sheet-shaped base and the first resin layer, as necessary.

The functional layer is not particularly limited, and a layer exhibiting a function as necessary can be appropriately selected depending on the intended purpose, such as maintenance of balance of curing, decoration, prevention of alteration to the electronic information recording module (IC portion), improvement of strength of the area of electronic information recording module, and the like.

Examples of the functional layer include a second sheet-shaped base, a second resin layer, a third resin layer and a back layer.

—Second Sheet-Shaped Base—

The second sheet-shaped base is provided on a surface of the first sheet-shaped base opposite to a surface thereof on which the reversible thermosensitive recording layer is provided.

The shape, structure and size of the second sheet-shaped base are not particularly limited and can be appropriately selected depending on the intended purpose. The second sheet-shaped base has a quadrangular shape, a circular shape, etc. Also, the second sheet-shaped base may have a single-layer structure, multi-layer structure, etc.

The second sheet-shaped base may be, for example, a resin sheet, a rubber sheet, a synthetic paper, a metal sheet, a glass sheet or a composite thereof. Among them, a resin sheet is particularly preferred.

Examples of the resin sheet include polyethylene terephthalate sheets, polycarbonate sheets, polystyrene sheets and polymethyl methacrylate sheets. These may be used alone or in combination. Among them, polyethylene terephthalate sheets are particularly preferred.

The second sheet-shaped base may be appropriately synthesized or may be a commercially available product.

The thickness of the second sheet-shaped base is preferably 25 μm to 100 μm, and more preferably 25 μm to 50 μm.

When the thickness is less than 25 μm, the curl preventing effect is decreased. When the thickness is more than 100 μm, the reversible thermosensitive recording medium becomes thick, impairing flexibility.

—Second Resin Layer—

The second resin layer bonds the second sheet-shaped base and the first sheet-shaped base.

The reversible thermosensitive recording medium is structured so as to embed the electronic information recording module between the first sheet-shaped base and the second sheet-shaped base, and the first sheet-shaped base and the second sheet-shaped base are bonded in such a manner that the module substrate is located between them.

The adhesive used for forming the second resin layer is not particularly limited, and can be appropriately selected depending on the intended purpose. For example, the materials exemplified as those for forming the first resin layer can be used.

As the material for forming the second resin layer, the same resin material as those used for forming the first resin layer is used, so that each resin layer can be easily formed at low cost.

However, the first resin layer preferably functions to strengthen mechanical strength of the electronic information recording module as a layer adjacent to the electronic information recording module. On the other hand, the second resin layer preferably functions to give flexibility to the reversible thermosensitive recording medium. To this end, each of the first resin layer and the second resin layer can be formed of different materials.

From such viewpoint, the elastic modulus of the first resin layer is preferably larger than that of the second resin layer.

Specifically, the elastic modulus of the first resin layer is preferably 500 MPa to 2,000 MPa, and more preferably 700 MPa to 1,000 MPa.

The elastic modulus of the second resin layer is 200 MPa to 1,000 MPa, and more preferably 250 MPa to 700 MPa.

—Third Resin Layer—

The reversible thermosensitive recording medium is not particularly limited. When a gap is formed between the concave portion and the electronic information recording element, a third resin layer is preferably formed in the gap between the concave portion and the electronic information recording element. The third resin layer is formed in the gap so as to prevent formation of depression corresponding to the concave portion in an area on the surface of the reversible thermosensitive recording medium, and the surface of the reversible thermosensitive recording medium is surely and uniformly brought into close contact with a thermal head. Thus, even though the concave portion has a shape of 260 µm in depth and 6 mm in width, an image having excellent image quality without occurring white voids and image fading can be formed and erased.

However, according to a principle of color development of the reversible thermosensitive recording layer, i.e. black is densely colored in portions rapidly cooled after heating, an adhesive portion does not contain metal, namely, an adhesive portion formed of a component having low heat conduction is not formed in a large area immediately below the reversible thermosensitive recording layer, and a counter bored area is formed narrowly with respect to the IC portion. Such structure basically less causes degradation of printing quality, and is superior in obtaining excellent printing quality to a PET base layer containing titanium dioxide in the component.

The material for forming the third resin layer is not particularly limited, and can be appropriately selected depending on the intended purpose. For example, the materials exemplified as those for forming the first resin layer can be used.

As the material for forming the third resin layer, the same resin material as those used for forming the first resin layer is used, so that each resin layer can be easily formed at low cost.

The elastic modulus of the third resin layer is preferably lower than those of the first sheet-shaped base and the second sheet-shaped base.

In this case, concentration to the electronic information recording element according to the deformation of the first sheet-shaped base and the second sheet-shaped base can be eased by appropriately deforming the third resin.

Specifically, the elastic modulus of the third resin layer preferably 700 MPa to 1,500 MPa, and more preferably 700 MPa to 1,000 MPa.

The elastic modulus of the first sheet-shaped base is preferably 2,000 MPa to 10,000 MPa, and more preferably 2,500 MPa to 5,000 MPa.

The elastic modulus of the second sheet-shaped base is preferably 2,000 MPa to 10,000 MPa, and more preferably 2,500 MPa to 5,000 MPa.

—Back Layer—

The back layer is provided for the purpose of preventing the reversible thermosensitive recording medium from curling.

The location of forming the back layer is not particularly limited, and can be appropriately selected depending on the intended purpose. For example, the back layer can be provided on the exposed surface of the second sheet-shaped base.

The back layer may contain a resin cured using, for example, heat, a UV ray and electron beam (preferably, a UV ray). Examples of the resin curable using heat, UV ray, electron beam, etc. include those exemplified above in relation to formation of the reversible thermosensitive recording layer. Also, these resins can be cured as described in relation to formation of the reversible thermosensitive recording layer.

Notably, the back layer can be formed similar to formation of the reversible thermosensitive recording layer. Preferably, a coating liquid for the back layer is applied onto the base sheet so that the formed back layer can successfully compensate shrinkage of a surface of the base sheet on which surface the reversible thermosensitive recording layer is provided. Through this treatment, the reversible thermosensitive recording medium, which is obtained after all the layers have been formed, can be smoothed.

In addition to the resin, the back layer may contain an organic filler, an inorganic filler, a lubricant, a color pigment, an antistatic agent, a UV ray absorber, and the like.

Examples of the inorganic filler include carbonates, silicates, metal oxides and sulfuric acid compounds.

Examples of the organic filler include silicone resins, cellulose resins, epoxy resins, nylon resins, phenol resins, polyurethane resins, urea resins, melamine resins, polyesters, polycarbonates, styrene resins, acrylic resins, polyethylenes, formaldehyde resins and polymethyl methacrylates.

Examples of the UV ray absorber include compounds having a salicylate structure, a cyano acrylate structure, a benzotriazole structure or a benzophenon structure.

Examples of the lubricant include synthetic waxes, vegetable waxes, animal waxes, higher alcohols, higher fatty acids, esters of higher fatty acids, and amides.

The thickness of the back layer is preferably 0.1 µm to 10 µm.

In the thus structured reversible thermosensitive recording medium, an exposed layer provided on the side opposite to the reversible thermosensitive recording layer via the first sheet-shaped base may be the first resin layer, the back layer, or the like.

In the case where in the exposed surface of the exposed layer, the maximum in-plane height $R_{max}$ is defined as a surface roughness, the surface roughness is not particularly limited. It is preferably 7 µm to 70 µm.

The surface roughness in such range can prevent double feed caused by water adhesion, even though water adheres to the exposed surface in a usage environment.

Namely, when the reversible thermosensitive recording media are stacked and printed at once, it is required to decrease the number of access to a printer and the number of operation, and to shorten the time for access to the printer by filling the printer with the media as many as possible. In this case, by adjusting the surface roughness to those as described above, double feed can be prevented even if water adheres to the exposed surface, and the decrease in the number of access to a printer and the number of operation, and shortening of the time for access can be achieved.

The adhesion force between the reversible thermosensitive recording media can be measured as follows.

Specifically, two reversible thermosensitive recording media are wet with water, and then inserted between rollers so as to come into close contact with each other. Each of two reversible thermosensitive recording media is held in a clamp of a tensile tester (digital force gauge produced by IMADA CO., LTD., maximum: 5 Kgf), and pulled out at 300 mm/min, to thereby measure the maximum load upon pulling out the media.

The adhesion force between the reversible thermosensitive recording media is preferably 5 N or less.

When it is more than 5 N, double feed caused by water adhesion may occur.

—Other Layers—

The other layers are not particularly limited, and can be appropriately selected depending on the intended purpose. For example, the protective layer may be formed on a surface of the reversible thermosensitive recording layer opposite to a surface thereof on which the first sheet-shaped base is provided. Between the protective layer and the reversible thermosensitive recording layer, an intermediate layer may be provided.

—Protective Layer—

The protective layer is provided for the purpose of protecting the reversible thermosensitive recording layer.

The protective layer is not particularly limited and may contain a resin cured using heat, a UV ray, electron beam, etc. Particularly preferred are resins cured using a UV ray or an electron beam.

Examples of resins curable using a UV ray (electron beam) include urethane acrylate oligomers, epoxy acrylate oligomers, polyester acrylate oligomers, polyether acrylate oligomers, vinyl oligomers and unsaturated polyester oligomers; and monofunctional or polyfunctional monomers such as acrylates, methacrylates, vinyl esters, ethylene derivatives and allyl compounds.

Notably, when a UV ray is used for crosslinking, a photopolymerization initiator and a photopolymerization accelerator are preferably used. Meanwhile, examples of the thermally-curable resin include those exemplified above in relation to formation of the reversible thermosensitive recording layer. Also, these resins can be cured as described in relation to formation of the reversible thermosensitive recording layer.

The thickness of the protective layer is preferably 0.1 μm to 10 μm.

—Intermediate Layer—

The intermediate layer is provided for the purposes of improving adhesiveness between the reversible thermosensitive recording layer and the protective layer, of preventing degradation of the reversible thermosensitive recording layer by application of a coating liquid for the protective layer, and of preventing an additive contained in the protective layer from infiltrating into the reversible thermosensitive recording layer. Provision of the intermediate layer can improve image stability.

The intermediate layer may contain a thermoplastic resin and/or a resin cured using heat, a UV ray, electron beam, etc.

The thermosetting resin or thermoplastic resin is not particularly limited. Examples of the thermosetting resin or thermoplastic resin include polyethylenes, polypropylenes, polystyrenes, polyvinyl alcohols, polyvinyl butyrals, polyurethanes, saturated polyesters, unsaturated polyesters, epoxy resins, phenol resins, polycarbonates and polyamides.

Meanwhile, examples of the resin curable using heat, a UV ray, electron beam, etc. is not particularly limited and include those exemplified above in relation to formation of the reversible thermosensitive recording layer.

Also, these resins can be cured as described in relation to formation of the reversible thermosensitive recording layer.

Notably, the intermediate layer can be formed similar to formation of the reversible thermosensitive recording layer.

If necessary, the intermediate layer may contain a filler, a UV ray absorber, etc.

The filler content of the intermediate layer is preferably 1% by volume to 95% by volume, more preferably 5% by volume to 75% by volume.

Meanwhile, the amount of the UV ray absorber contained in the intermediate layer is preferably 0.5% by mass to 10% by mass with respect to the resin.

The thickness of the intermediate layer is preferably 0.1 μm to 20 μm, more preferably 0.3 μm to 3 μm.

Also, the intermediate layer and/or protective layer, which are to be laminated over the reversible thermosensitive recording layer, preferably contain a resin having low oxygen permeability. This prevents a leuco dye and a color developer contained in the reversible thermosensitive recording layer from oxidization.

Also, an under layer may be provided between the reversible thermosensitive recording layer and the first sheet-shaped base. Provision of the under layer can improve sensitivity of color development of the reversible thermosensitive recording layer and adhesiveness between the reversible thermosensitive recording layer and the first sheet-shaped base.

Also, in order for the reversible thermosensitive recording layer to develop color through application of a laser light, a light-heat converting layer, which converts light to heat upon absorbing a laser light, may be provided over the reversible thermosensitive recording layer.

Furthermore, a heat insulating layer (e.g., air layer) may be provided over the reversible thermosensitive recording layer to prevent heat release.

The thus formed reversible thermosensitive recording medium of the present invention preferably has a total thickness of 150 μm to 500 μm, and more preferably 250 μm to 400 μm, and particularly preferably 270 μm to 300 μm.

When the total thickness is more than 500 μm, the flexibility is impaired and effect of close contacting with a head cannot be exhibited. Moreover, when the total thickness is more than 580 μm, jam occurs in a conveyance system of a printer.

When the total thickness is less than 150 μm, the medium is excessively thin, and the medium is not sufficiently pressed to a thermal head, causing printing defect.

The load for bending deformation, which indicates flexibility, of the reversible thermosensitive recording medium not particularly limited and can be appropriately selected depending on the intended purpose. It is preferably less than 45 gf, and more preferably 28 gf or less.

The load for bending deformation, which indicates flexibility, of the reversible thermosensitive recording medium can be measured as follows.

A tag sample having 200 mm long and 85 mm wide is placed flatly with no load over two rectangular pedestals, which are located in parallel with a space of 100 mm therebetween. At the center (the point of 50 mm of the space 100 mm between the pedestals and the center of the width 85 mm of the tag) of the tag placed flatly is pressed from upward to downward, using a typical spring balancer (Maximum 500 gf, a pressing probe rod having a diameter of 3 mm), and when the tag is deformed 10 mm downward in the height direction a load is measured (see FIG. 32).

Hereinafter, the embodiments of the reversible thermosensitive recording medium of the present invention will be described.

—First Embodiment—

Figure 2:
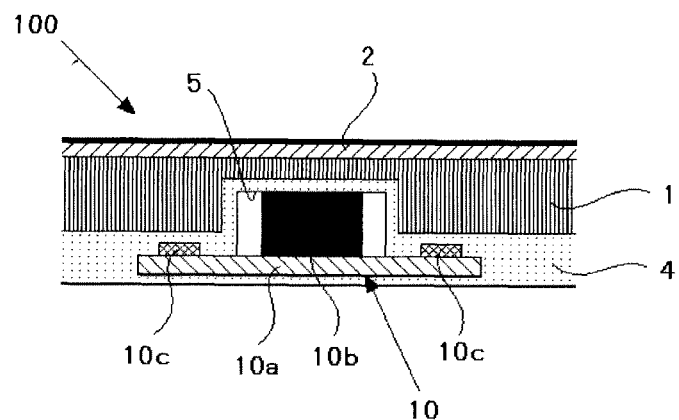
FIG. 2 is a cross-sectional view showing a schematic structure of a reversible thermosensitive recording medium 100 according to an embodiment of the present invention.
Figure 3:
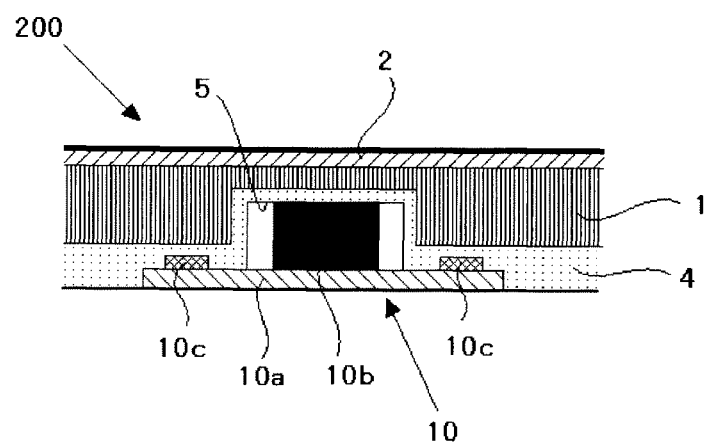
FIG. 3 is a cross-sectional view showing a schematic structure of a reversible thermosensitive recording medium 200 according to an embodiment of the present invention.

As shown in FIG. 2, a reversible thermosensitive recording medium 100 of the first embodiment includes a reversible thermosensitive recording layer 2, a first sheet-shaped base 1 provided adjacent to the reversible thermosensitive recording layer 2, an electronic information recording module 10 including a module substrate 10a, and a convex-shaped electronic information recording element 10b and an antenna circuit 10c both disposed on the module substrate 10a, a first resin layer 4 for bonding the first sheet-shaped base 1 to the electronic information recording module 10.

Here, a concave portion 5 is formed on a surface of the first sheet-shaped base 1 opposite to a surface thereof on which the reversible thermosensitive recording layer 2 is provided. The electronic information recording module 10 is provided so as to insert the electronic information recording element 10b into the concave portion 5 of the first sheet-shaped base 1. Moreover, the first resin layer 4 is provided so as to cover a surface of the electronic information recording module 10 opposite to a surface thereof on which the electronic information recording element 10b is provided, to thereby uniformly form a layer having an exposed surface.

By making the reversible thermosensitive recording medium 100 thin and flexible, a thermal head, an erasing bar, an erasing roller and an erasing plate are easily brought into contact with the reversible thermosensitive recording medium 100 upon forming and erasing an image. This prevent uneven contact from the top surface using the thermal head or erasing bar and from the under surface using a platen roller, and uneven color development and erasure caused by contact failure do not occur, and variations of head are tolerated. Thus, printing quality is stabilized.

Consequently, even when image erasure and formation is performed at a high speed of 3 IPS or higher, white voids and image fading do not occur upon image formation and image erasure can be completely performed in the concavo-convex areas each corresponding to the surrounding area of the electronic information recording module 10, to the electronic information recording element 10b, to the antenna circuit 10c and to the conductive member, and excellent image quality can be obtained.

Owing to flexibility, the concentrated bending load on the caulking portion of IC can be reduced, and local bending can be prevented. Consequently, flexibility and shape recovering properties can be obtained, causing less occurrence of disconnection and failure in the caulking portion of IC. Moreover, the reversible thermosensitive recording medium fits comfortably in hands when it is held upon operation, and handling is improved.

Additionally, as the electronic information recording element 10b is inserted into the concave portion 5 of the first sheet-shaped base 1, and unevenness and concavo-convex portions caused by the electronic information recording module 10b can be eliminated, and the entire reversible thermosensitive recording medium can be made flat. This also allows to improve qualities of image erasure and formation at a high speed of 3 IPS or higher.

A method for producing the reversible thermosensitive recording medium 100 of the first embodiment is as follows.

Firstly, on a surface of the first sheet-shaped base 1 opposite to a surface on which the reversible thermosensitive recording layer 2 is formed, a concave portion 5 is formed using a laser in a dimension for housing the electronic information recording element 10b disposed on the electronic information recording module 10 to be inserted thereinto later.

The concave portion 5 is formed larger than the electronic information recording element 10b. Specifically, the dimension of length and width of the concave portion 5 are preferably respectively larger than those of the electronic information recording element 10b by 1.5 mm or less, more preferably 1.0 mm or less. The depth of the concave portion 5 is preferably deeper than the height of the electronic information recording element 10b by 50 μm or less, more preferably 20 μm or less.

Next, in the surface of the first sheet-shaped base 1 on which the concave portion is formed, a coating liquid for a first resin layer 4 is preliminarily applied onto the entire area in which the electronic information recording module 10 would be mounted, and the electronic information recording element 10b is inserted into the concave portion 5, and then via the first resin layer 4 the electronic information recording module 10 is mounted on the first sheet-shaped base 1.

Figure 4:
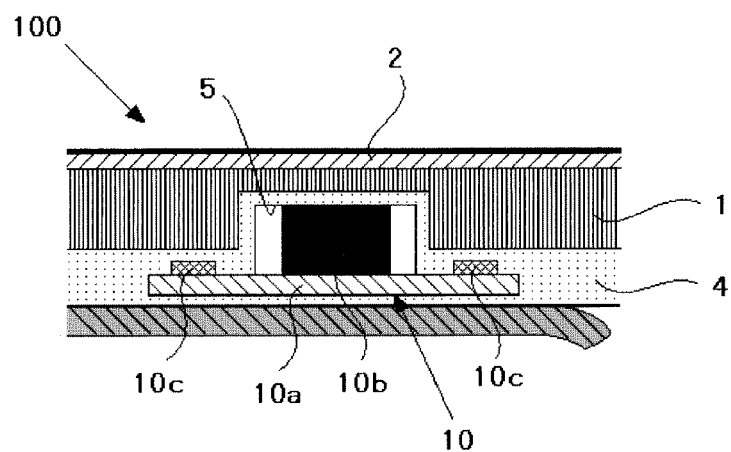
FIG. 4 is a schematic cross-sectional view showing an example of a production process of the reversible thermosensitive recording medium 100.

On the other hand, onto a release paper having a uniform thickness, the coating liquid for the first resin layer 4 is applied, and the release paper and the first sheet-shaped base 1 are overlapped so that side of the release paper onto which the coating liquid for the first resin layer 4 has been applied faces the side of the first sheet-shaped base 1 the electronic information recording module 10 has been mounted. The overlapped release paper and first-sheet-shaped base are inserted between a pair of rollers, so that the coating liquid for the first resin layer 4 flows by the precision of the gap formed by the rollers and the surface properties of the rollers to thereby bond the release paper and the first sheet-shaped base 1. FIG. 4 shows a structure of the reversible thermosensitive recording medium 100 in which the total thickness has been uniformized by passing the medium through a pair of rollers.

By the roller, pressure is applied so as not to break the electronic information recording module 10. Consequently, the coating liquid for the first resin layer 4 flows, the coating liquid of the first resin layer 4 is applied to the electronic information recording module 10 so as to compensate for the thickness of the electronic information recording module 10, and air gap surrounding the electronic information recording module 10 can be eliminated. Next, the release paper is removed, and the resultant product is cut into an appropriate size to thereby produce the reversible thermosensitive cording medium 100 having a uniform thickness without having concavo-convex portions.

—Second Embodiment—

In a reversible thermosensitive recording medium 200 of the second embodiment, the first resin layer 4 does not fully cover the electronic information recording module 10, but the first resin layer 4 and the electronic information recording module 10 form one surface of the reversible thermosensitive recording medium 200.

In the reversible thermosensitive recording medium 200 of the second embodiment as described above, a functional layer can be optionally provided on the surface formed of the electronic information recording module 10 and the first resin layer 4.

A method for producing the reversible thermosensitive recording medium 200 of the second embodiment is as follows.

Firstly, on a surface of the first sheet-shaped base 1 opposite to a surface thereof on which the reversible thermosensitive recording layer 2 is formed, a concave portion 5 is formed using laser in a dimension for housing an electronic information recording element 10b disposed on an electronic information recording module 10 to be inserted later.

Next, in the surface of the first sheet-shaped base 1 on which the concave portion is formed, a coating liquid for a first resin layer 4 is preliminarily applied onto the entire area in which the electronic information recording module 10 would be mounted, and the electronic information recording element 10b is inserted into the concave portion 5, and then via the first resin layer 4 the electronic information recording module 10 is mounted on the first sheet-shaped base 1.

On the other hand, a release paper having a uniform thickness and the first sheet-shaped base 1 are overlapped so that the release paper faces the side of the first sheet-shaped base 1 on which the electronic information recording module 10 is mounted. The overlapped release paper and first-sheet-shaped base 1 are inserted between a pair of rollers. By the rollers, the reversible thermosensitive recording medium 200 is pressed so as to bond the first resin layer 4 and the electronic information recording module 10 in such a manner that the coating liquid for the first resin layer 4 thickly applied on the bottom of the electronic information recording module 10, and then spreads by means of pressure until the first resin layer 4 and the electronic information recording module 10 forms one surface of the reversible thermosensitive recording medium. By the roller, pressure is applied so as not to break the electronic information recording element 10b.

The coating liquid for the first resin layer 4 flows and fills the surrounding area of the electronic information recording module 10 so as to form one surface of the reversible thermosensitive recording medium. As a result, the first resin layer 4 covers the electronic information recording module 10, and air gap surrounding the electronic information recording module 10 can be eliminated.

Next, the release paper is removed, and the resultant product is cut into an appropriate size to thereby produce the reversible thermosensitive recording medium 200 having a uniform thickness without having concavo-convex portions, in which the surface of the electronic information recording module 10 is not covered with the first resin layer 4.

—Production Method by Continuous Operation—

Figure 5:
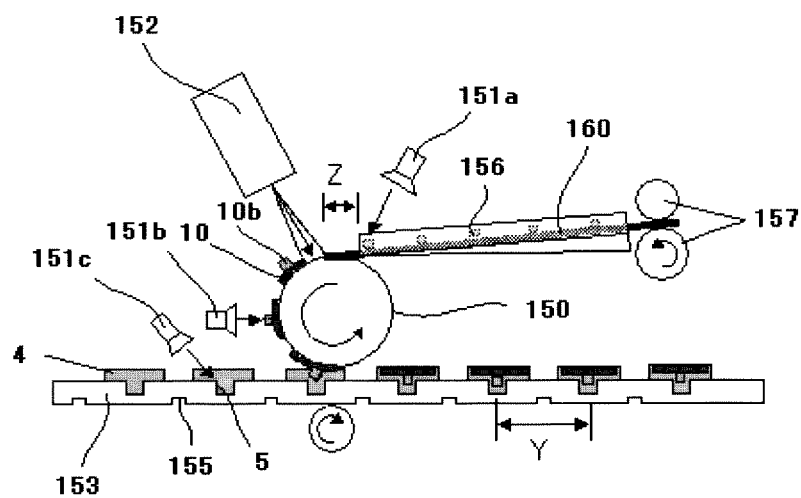
FIG. 5 is a schematic diagram of a device showing an example of high precision positioning and bonding an electronic information recording element (IC chip portion) and a concave portion.

Furthermore, with reference to FIG. 5, a production method by continuous operation will be described. The production method by continuous operation is performed as follows: an electronic information recording element 10b (IC portion) on an electronic information recording module (inlet) 10 is positioned with high precision and inserted into a concave portion 5 of a surface of the first sheet-shaped base 1 opposite to a surface thereof, on which a reversible thermosensitive recording layer is formed, by not intermittent operation but continuous operation.

Specifically, a continuous inlet sheet 160 is straightly conveyed onto a rotating cylindrical-shaped vacuum drum 150, so as to mount the continuous inlet thereon. The absorption of the vacuum drum 150 is always turned on, and when the inlet sheet 160 is straightly conveyed thereon, the vacuum drum starts absorbing.

Just before the absorption, register mark 156 (or an IC portion) on the inlet is detected using a position sensor 151a for the register mark 156 on the inlet, and then the inlet sheet is conveyed only at a certain distance so as to locate in a position at a certain angle of the vacuum drum 150 based on the result of detection, the inlet sheet is conveyed by nip rollers 157 at the same speed as that of the vacuum drum 150 according to the travel of the inlet position by the rotation of the vacuum drum 150 so as to eliminate the tension from the infeed side (nip rollers 157 side) to the inlet, to thereby prevent displacement of the inlet position.

Next, in order to cut the inlet sheet 160 into a plurality of sheets during rotating and traveling of the inlet sheet 160, the inlet sheet 160 is straightly scanned at high speed with a $CO_2$ laser maker 152 so as to cut the inlet sheet 160 into strips of paper. The inlet sheet 160 on the curved surface of the vacuum drum 150 is cut into an inlet 10 on the vacuum drum 150. Owing to the mechanism of the sheet feeder, even in the state where a portion remaining without being cut occurs during cutting, the displacement of the inlet does not occur.

If the inlet sheet is transversely cut at 0.2 s, 0.1 s after starting cutting, the half of the cut portion of the inlet sheet freely moves, but the left portion thereof is not cut and connected with the original inlet sheet. When the travel speed of the original inlet sheet is not the same as the rotation speed of the drum, for example, when the travel speed is late, the tensile force to the direction of the original inlet sheet acts at the portion remaining without being cut, the inlet which has been positioned is rotated on the vacuum drum, causing the displacement. Here, this state is referred to as a portion remaining without being cut.

Moreover, as the inlet sheet is cut during rotation so that the cut surface becomes straight line (axial direction of the vacuum drum 150), the rotational speed of the vacuum drum 150 is input by an encoder, and the laser marker 152 tracks at an automated speed, and moved obliquely.

As the inlet to be provided on the vacuum drum 150 has a curved surface, the laser marker 152 tracks at an automated speed in the Z axial direction by a galvano lens mechanism within a laser. Alternatively, the positional difference of the Z axis on the vacuum drum 150 having a large curvature, i.e. a focus difference in height is decreased to 10 mm or less, preferably 5 mm or less, and then, the inlet sheet is cut at a position of an average Z axis with the laser marker 152 without tracking in the Z axis.

The position of the inlet 10 which has been cut without displacement is confirmed with a position sensor 151b for the inlet, and simultaneously the concave portion 5 is formed in the base 153 flowing under the vacuum drum 150, and immediately before the inlet is conveyed to the position below the vacuum drum 150 the concave portion 5 or the register mark 155 on the base 153 corresponding to the concave portion 5 is confirmed using a position sensor 151c for the register mark. Thus, the difference between the position of the IC portion 10b and the position of the concave portion 5 can be confirmed immediately before bonding them.

The difference in position is corrected on the vacuum drum 150 during rotation. With respect to the new inlet conveyed onto the vacuum drum while the position of the IC portion 10b is corrected, the conditions that a pulse for correction is adjusted so as to locate the inlet in a position at a certain angle of the vacuum drum 150 is not shifted.

To the inlet 10, in which the position is corrected, the base 153 is pressed to the side of the vacuum drum 150 using a rubber press roller, and while the edge of the inlet whose surface is rounded is gradually pressed between the a pair of rollers so as to remove air bubbles, the IC portion 10b is inserted into the concave portion 5 with high precision to thereby bond the inlet to the base 153.

As to the displacement, it is necessary to prevent the displacement in the width direction between the base 153 and the inlet 10b. Firstly, the displacement from the standpoint of the base 153 will be described below.

1. Making basic conveyance accurate: correcting horizontal degree of roller/S lap passage, and roughing surface of roller for providing a grip for preventing displacement in a width direction By these, a first sheet shaped base is rolled out straight from a roller, preventing from being meandered. "S lap" means a sheet passage through two rollers in the shape of "S" (if there are two roller both having the same height, a sheet is passed through from the top of the first roller to the bottom of the second roller). By this sheet passage, a grip force is generated against the roller when a tension is applied to the sheet. Moreover, a grip force is also generated by simply roughing a surface of the roller. These prevent displacement in the width direction or meandered conveyance.

2. High speed tracking: preventing sagging of a sheet or meandered conveyance due to variation in tension, by tension pick control The reduced tension makes the base free, easily causing a displacement in a width direction. Therefore, a width direction of the base and straight conveyance thereof are stably maintained by tension-pick control (tension sensor control) that reacts with a minute movement of the base.

3. Fundamentally reducing occurrences of displacement by setting the distance between the place where a laser counter-boring step is performed and the place where an attaching step is performed, as short as possible, such as within 1 m 4. Positioning the edge by a guide rail or ring for positioning the width on a roller in the laser counter-boring step through the attaching step.

These guide rail and ring guide on the roller have functions of regulating the edge of the base and preventing the displacement in the width direction.

5. Increasing the effect of the guide rail for positioning by always using a thick base having a rigidness, such as those having a thickness of 188 μm to 250 μm, for inserting IC.

The bonding pitch (Y in FIG. 5) can be arbitrarily changed depending on the length of a reversible thermosensitive recording medium to be a product and the length of a margin necessary for a portion between the reversible thermosensitive recording media (margin for punching out).

Next, the displacement from the standpoint of the inlet 10b will be explained.

1. Making basic conveyance accurate: correcting horizontal degree of roller IS lap passage, and roughing surface of roller for providing a grip for preventing displacement in a width direction Likewise the case of the base 153, by these, a first sheet shaped base is rolled out straight from a roller, preventing from being meandered. "S lap" means a sheet passage through two rollers in the shape of "S" (if there are two roller both having the same height, a sheet is passed through from the top of the first roller to the bottom of the second roller). By this sheet passage, a grip force is generated against the roller when a tension is applied to the sheet (Z in FIG. 5). Moreover, a grip force is also generated by simply roughing a surface of the roller. These prevent displacement in the width direction or meandered conveyance.

2. High speed tracking: preventing sagging of a sheet or meandered conveyance due to variation in tension by tension pick control Likewise the case of the base 153, the reduced tension makes the base free, easily causing a displacement in a width direction. Therefore, a width direction of the base and straight conveyance thereof are stably maintained by tension-pick control (tension sensor control) that reacts with a minute movement of the base.

3. Positioning the edge by a guide rail or ring for positioning the width on a roller in the laser counter-boring step through the attaching step.

4. Centering the inlet to adjust the variation in the width of the inlet between the types or lots thereof, by a jig for positioning and finely adjusting the width position of an unwinder.

There are cases where a position of an IC chip from the edge of the inlet base is varied due to variation in the materials of the slit. Before the inlet material is set in an unwinder, the distance between the edge of the inlet base and the position of the IC chip is confirmed, and the positioning in terms of the width direction on the unwinder is performed by using a jip that is adjusted and set in terms of the size based on the confirmed distance.

The displacement in the traveling direction or width direction occurred between the concave portion and IC portion 10b after the aforementioned procedures is confirmed and detected as an XY displacement value by means of a CCD camera set at the position that is located downstream of the area where the bonding is performed. The correction of this XY displacement can be easily performed by precisely adjusting based on transferred automatic feed back of XY displacement value by a laser mark positioning program of a $CO_2$ laser marker 152.

By highly accurately positioning in the aforementioned manner, the space in the width direction between the IC portion (electronic information recording element) 10b to be inserted and the concave portion 5 can be positioned and the IC portion can be inserted without any problem, even when the concave portion 5 is small in size such that it is bigger than the electronic information recording element only by 1.0 mm to 1.5 mm both in length and width directions.

Moreover, as the concave portion 5, not a through-hole, is formed by a laser processing or micro-mill processing, the depth of the concave portion can be arbitrarily adjusted only by controlling the setting condition. By this, the difference between the height of the IC portion (electronic information recording element) 10b to be inserted into the concave portion 5 and the depth of the concave portion 5 (the space between the concave portion 5 and the electronic information recording element 10b in the depth direction of the concave portion 5) can be set 0 μm to 50 μm, preferably 0 μm to 20 μm.

In order to form an image, the reversible thermosensitive recording medium of the present invention is heated to a temperature higher than a color developing temperature and then rapidly cooled.

Specifically, when heated for a short time using a thermal head or a laser light, the reversible thermosensitive recording layer is locally increased in temperature. This reversible thermosensitive recording layer immediately undergoes thermal diffusion (i.e., rapid cooling) to develop color.

Meanwhile, in order to erase an image, the reversible thermosensitive recording layer is heated using a heat source for a long time and then cooled, or is heated to a temperature slightly lower than a color developing temperature. When heated for a long time, the reversible thermosensitive recording layer is increased in temperature in a wide range thereof.

Thus, it takes a long time for the recording medium to be cooled, and the recording medium is in a color erased state.

The heat source used may be a heating roller, a heating stamp, a heating blow, etc. During image erasure, applied energy may be decreased to a level slightly lower than the level at which energy has been applied for image formation by controlling a voltage applied to a thermal head and the pulse width. In this method, use of only a thermal head can perform both image formation and image erasure; i.e., can perform so called overwriting.

Figure 6:
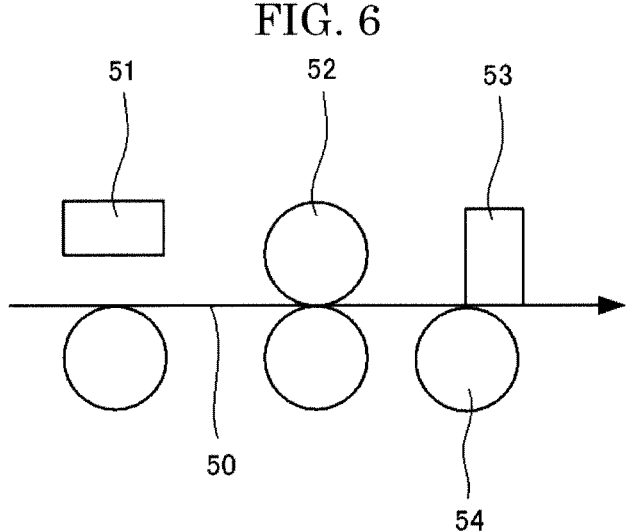
FIG. 6 is a schematic view showing an example of a printer for forming and erasing an image on the reversible thermosensitive recording medium.

FIG. 6 shows an example of a printer for forming and erasing an image on the reversible thermosensitive recording medium of the present invention.

In this printer, a reversible thermosensitive recording medium 50 is transferred in a direction indicated by an arrow and discharged through a ceramic bar 51, transfer rollers 52, a thermal head 53 and a platen roller 54 to the outside of the printer. The ceramic bar 51 erases to an image, and the thermal head 53 and the platen roller 54 form an image.

Figure 7:
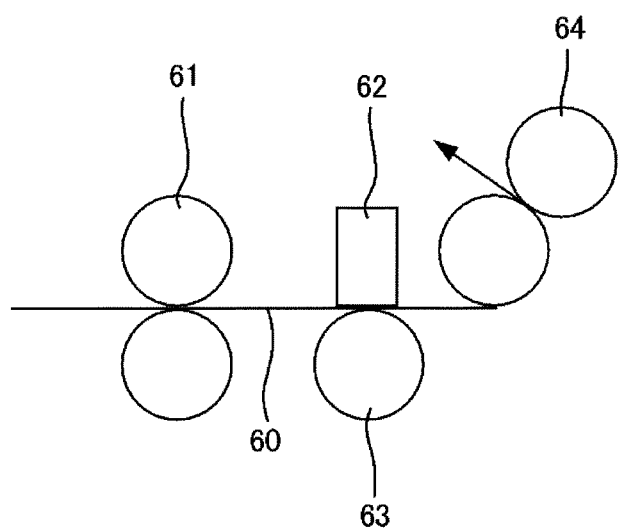
FIG. 7 is a schematic view showing another example of a printer for forming and erasing an image on the reversible thermosensitive recording medium.

FIG. 7 shows an example of a printer for forming and erasing an image on the reversible thermosensitive recording medium of the present invention. In this printer, a reversible thermosensitive recording medium 60 is transferred in a direction indicated by an arrow and discharged through a heat roller 61, a thermal head 62, a platen roller 63 and a transfer roller 64 to the outside of the printer. The heat roller 61 erases an image, and the thermal head 62 and the platen roller 63 form an image.

The transfer speed at which the reversible thermosensitive recording medium 50 is transferred is not particularly limited and can be appropriately selected depending on the purpose. In the present invention, even when image erasure and formation is performed at a high speed of 3 IPS or higher, white voids and image fading do not occur in the formed image areas each corresponding to the surrounding area of the electronic information recording sheet, to the electronic information recording element, to the antenna circuit and to the conductive member; and image erasure can be completely performed.

The reversible thermosensitive recording medium and printer are configured so that an image is precisely formed and erased through heating. In particular, small sized printers are configured so that an image is precisely formed and erased by adjusting heating energy applied in a heating treatment, since image formation and image erasure are performed at shorter intervals.

—Third Embodiment—

Figure 21:
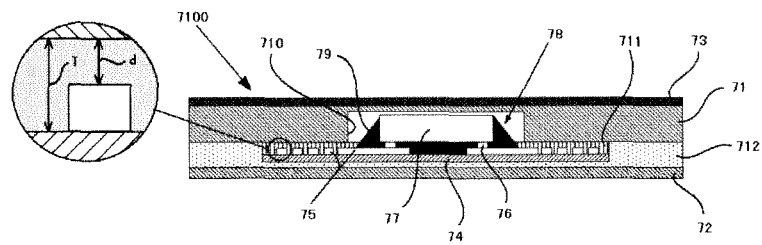
FIG. 21 is a schematic view showing a layer structure of a reversible thermosensitive recording medium 7100 according to the third embodiment.

A reversible thermosensitive recording medium 7100 of the third embodiment will be described with reference to FIG. 21. The reversible thermosensitive recording medium 7100 includes a reversible thermosensitive recording layer 73, a first sheet-shaped base 71, which is provided adjacent to the reversible thermosensitive recording layer 73 and has a concave portion 710 on a surface opposite to a surface on which the reversible thermosensitive recording layer 73 is formed, a second sheet-shaped base 72 which is provided over a surface of the first sheet-shaped base 71 opposite to a surface thereof on which the reversible thermosensitive recording layer 73 is formed, and an electronic information recording module 78, which is provided between the first sheet-shaped base 71 and the second sheet-shaped base 72, and includes a module substrate 74, an antenna circuit 75 provided on the substrate 74 and an IC chip 77 fixed on the circuit board 75 with a bump 76 and an unerfill 79, wherein the first sheet-shaped base 71 is bonded to an electronic information recording module 78 via a first resin layer 711, and the second sheet-shaped base 72 is bonded to the first sheet-shaped base 71 via the second resin layer 712.

In the reversible thermosensitive recording medium 7100, the IC chip 77 is inserted into the concave portion 710, so as to leave a gap between the IC chip 77 and the concave portion of the first sheet-shaped base 71 in the thickness direction of the reversible thermosensitive recording medium 7100, and the first resin layer 711 is provided so that the shortest distance "d" between the antenna circuit 75 and the first sheet-shaped base 71 becomes 10 µm or more. That is, the first resin layer 711 is provided so as to form a thickness of 10 µm or more with respect to the height of the IC chip 77 in the thickness direction of the reversible thermosensitive recording medium 7100. The thickness of the first resin layer 711 is represented by T.

According to the reversible thermosensitive recording medium 7100, the first resin layer 711 prevents the convex shape of the IC chip from contact with the first sheet-shaped base 71, and compensates for the convexo-concave shape of the antenna circuit 75, so that the total thickness of the reversible thermosensitive recording medium 7100 can be kept thin. Thus, without occurring failure in color development, caused by the IC chip 77 and the convexo-concave shape of the antenna circuit 75, image formation and erasure can be performed on the reversible thermosensitive recording layer 73.

As the total thickness of the reversible thermosensitive recording medium 7100 is thin, the reversible thermosensitive recording medium 7100 has excellent flexibility. The thickness thereof is adjusted by the first sheet-shaped base 71, the second sheet-shaped base 72, the first resin layer 711, and the second resin layer 712, and the mechanical durability of the electronic information recording module 78 may not be degraded, to thereby maintain bending durability, and contact pressure resistance.

—Fourth Embodiment—

Figure 22:
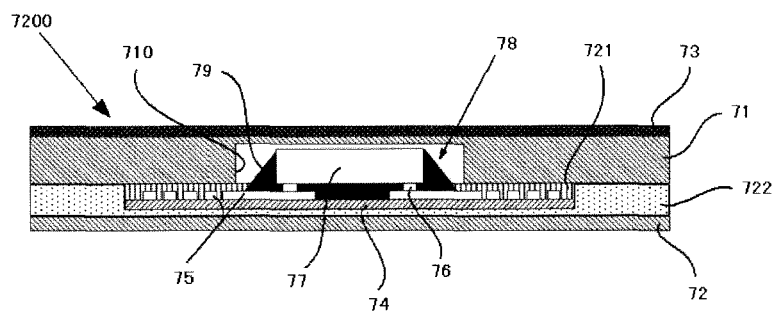
FIG. 22 is a schematic view showing a layer structure of a reversible thermosensitive recording medium 7200 according to the fourth embodiment.

A reversible thermosensitive recording medium 7200 according to the fourth embodiment will be described with reference to FIG. 22. The reversible thermosensitive recording medium 7200 includes a first resin layer 721 and a second resin layer 722.

The elastic modulus of the first resin layer 721 is formed larger than the elastic modulus of the second resin layer 722.

Thus, when the reversible thermosensitive recording medium 7200 is deformed by bending, the stress is eased by the soft second resin layer 722, and the mechanical strength of the electronic information recording module 78 against deformation is reinforced by the first resin layer 721, which is harder than the second resin layer 722, to thereby decrease communication defect due to the breakage of the electronic information recording module 78.

Other than the above description, the detailed description of the reversible thermosensitive recording medium 7200 of the fourth embodiment is the same as that of the third embodiment. Thus, the description thereof is omitted.

—Fifth Embodiment—

Figure 23:
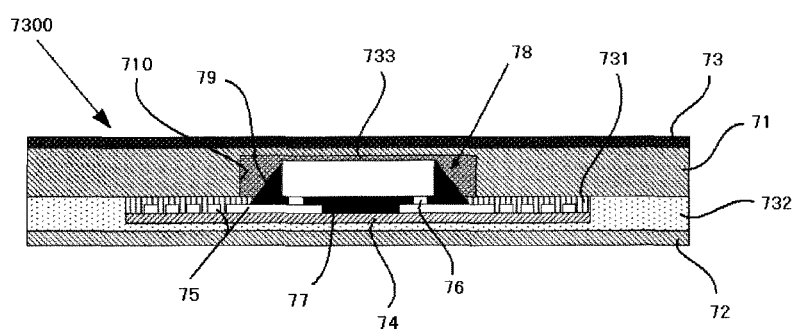
FIG. 23 is a schematic view showing a layer structure of a reversible thermosensitive recording medium 7300 according to the fifth embodiment.

A reversible thermosensitive recording medium 7300 of the fifth embodiment will be described with reference to FIG. 23. The reversible thermosensitive recording medium 7300 includes a first resin layer 731 and a second resin layer 732, and further include a third resin layer, which is formed by filling the concave portion 710 of the reversible thermosensitive recording medium 7100 of the third embodiment with a resin.

According to the reversible thermosensitive recording medium 7300, the third resin layer formed in the concave portion 710 can prevent formation of a dent on the surface area of the reversible thermosensitive recording medium 7300 due to the concave portion 710, to thereby perform high quality image formation and erasure.

Other than the above description, the detailed description of the reversible thermosensitive recording medium 7300 of the fifth embodiment is the same as that of the third embodiment. Thus, the description thereof is omitted.

—Sixth Embodiment—

Figure 24:
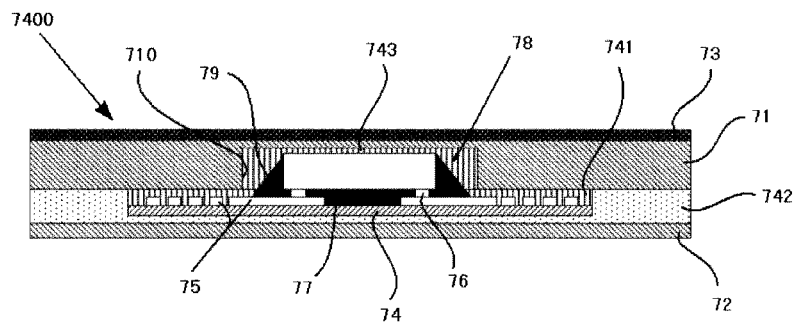
FIG. 24 is a schematic view showing a layer structure of a reversible thermosensitive recording medium 7400 according to the sixth embodiment.

A reversible thermosensitive recording medium 7400 of the sixth embodiment will be described with reference to FIG. 24. The reversible thermosensitive recording medium 7400 includes a first resin layer 741, a second resin layer 742, and a third resin layer 743. The materials for the first resin layer 741 and the third resin layer 743 are the same resin.

Therefore, according to the reversible thermosensitive recording medium 7400, by decreasing the number of components, the reversible thermosensitive recording medium can be easily provided at low cost.

Other than the above description, the detailed description of the reversible thermosensitive recording medium 7400 of the sixth embodiment is the same as that of the fifth embodiment. Thus, the description thereof is omitted.

—Seventh Embodiment—

Figure 25:
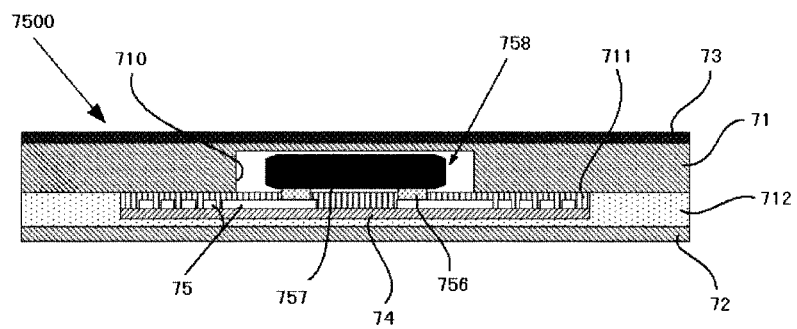
FIG. 25 is a schematic view showing a layer structure of a reversible thermosensitive recording medium 7500 according to the seventh embodiment.

A reversible thermosensitive recording medium 7500 according to seventh embodiment will be described with reference to FIG. 25. The reversible thermosensitive recording medium 7500 relates to alteration example of the electronic information recording module. The reversible thermosensitive recording medium 7500 includes an electronic information recording module 758, in which an IC package 757 is connected to an antenna circuit 75 via a bump 756.

Other than the above description, the detailed description of the reversible thermosensitive recording medium 7500 of the seventh embodiment is the same as that of the third embodiment. Thus, the description thereof is omitted.

—Eighth Embodiment—

Figure 26:
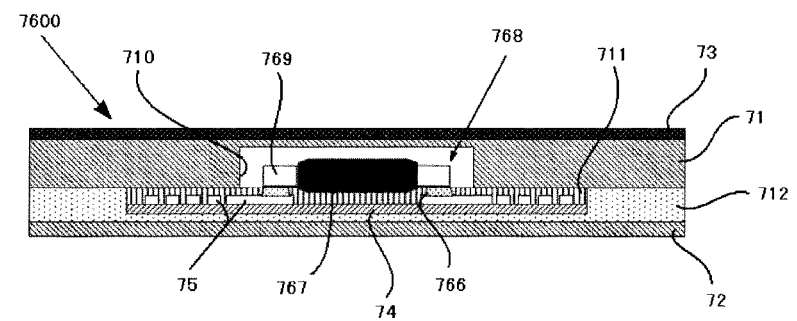
FIG. 26 is a schematic view showing a layer structure of a reversible thermosensitive recording medium 7600 according to the eighth embodiment.
Figure 27A:
FIG. 27A is a schematic view showing a production process of Production Example 1 (first).
Figure 27B:
FIG. 27B is a schematic view showing the production process of Production Example 1 (second).
Figure 27C:
FIG. 27C is a schematic view showing the production process of Production Example 1 (third).
Figure 27D:
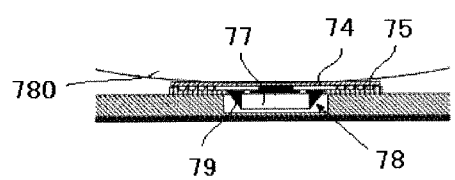
FIG. 27D is a schematic view showing the production process of Production Example 1 (fourth).
Figure 27E:
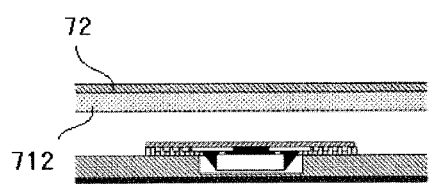
FIG. 27E is a schematic view showing the production process of Production Example 1 (fifth).
Figure 27F:
FIG. 27F is a schematic view showing the production process of Production Example 1 (sixth).
Figure 27G:
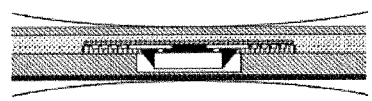
FIG. 27G is a schematic view showing the production process of Production Example 1 (seventh).
Figure 27H:
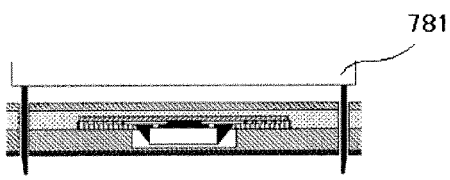
FIG. 27H is a schematic view showing the production process of Production Example 1 (eighth).
Figure 27I:
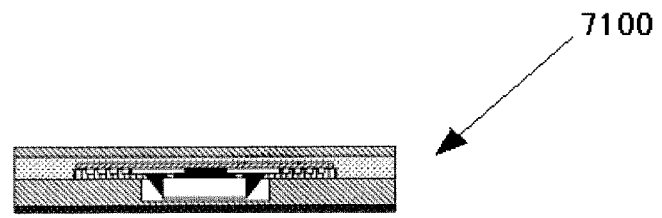
FIG. 27I is a schematic view showing the production process of Production Example 1 (ninth).
Figure 28A:
FIG. 28A is a schematic view showing a production process of Production Example 2 (first).
Figure 28B:
FIG. 28B is a schematic view showing the production process of Production Example 2 (second).
Figure 28C:
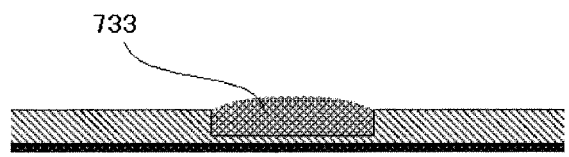
FIG. 28C is a schematic view showing the production process of Production Example 2 (third).
Figure 28D:
FIG. 28D is a schematic view showing the production process of Production Example 2 (fourth).
Figure 28E:
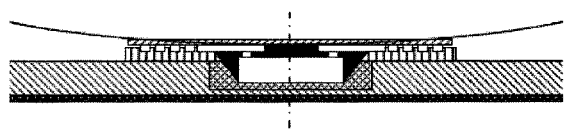
FIG. 28E is a schematic view showing the production process of Production Example 2 (fifth).
Figure 28F:
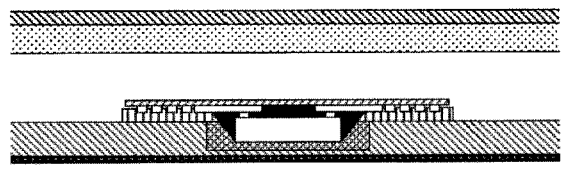
FIG. 28F is a schematic view showing the production process of Production Example 2 (sixth).
Figure 28G:
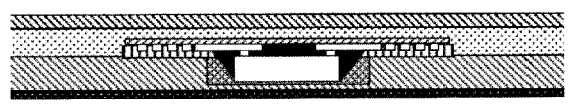
FIG. 28G is a schematic view showing the production process of Production Example 2 (seventh).
Figure 28H:
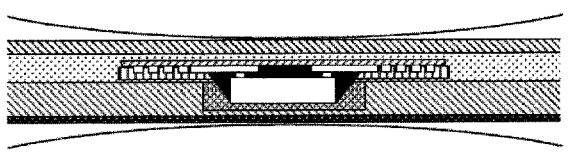
FIG. 28H is a schematic view showing the production process of Production Example 2 (eighth).
Figure 28I:
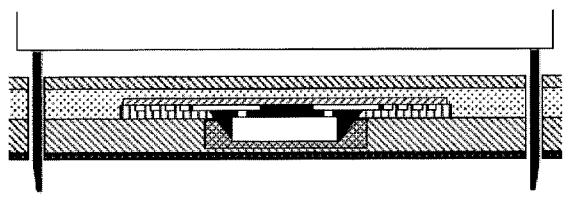
FIG. 28I is a schematic view showing the production process of Production Example 2 (ninth).
Figure 28J:
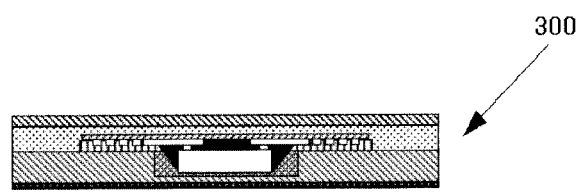
FIG. 28J is a schematic view showing the production process of Production Example 2 (tenth).
Figure 29A:
FIG. 29A is a schematic view showing a production process of Production Example 3 (first).
Figure 29B:
FIG. 29B is a schematic view showing the production process of Production Example 3 (second).
Figure 29C:
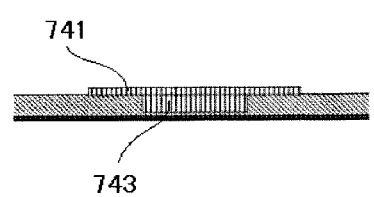
FIG. 29C is a schematic view showing the production process of Production Example 3 (third).
Figure 29D:
FIG. 29D is a schematic view showing the production process of Production Example 3 (fourth).
Figure 29E:
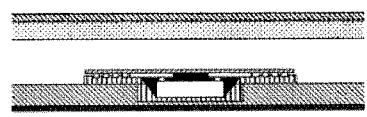
FIG. 29E is a schematic view showing the production process of Production Example 3 (fifth).
Figure 29F:
FIG. 29F is a schematic view showing the production process of Production Example 3 (sixth).
Figure 29G:
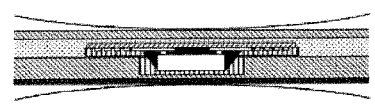
FIG. 29G is a schematic view showing the production process of Production Example 3 (seventh).
Figure 29H:
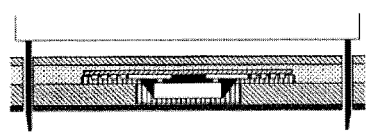
FIG. 29H is a schematic view showing the production process of Production Example 3 (eighth).
Figure 29I:
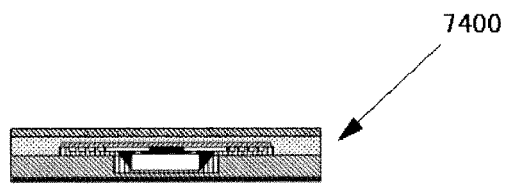
FIG. 29I is a schematic view showing the production process of Production Example 3 (ninth).

A reversible thermosensitive recording medium 7600 of the eighth embodiment will be described with reference to FIG. 26. The reversible thermosensitive recording medium 7600 relates to another alteration example of the electronic information recording module. The reversible thermosensitive recording medium 7600 includes an electronic information recording module 768, in which an IC package 767 is connected to an antenna circuit 75 via an external terminal 769 and a soldering 766.

Other than the above description, the detailed description of the reversible thermosensitive recording medium 7600 of the eighth embodiment is the same as that of the third embodiment. Thus, the description thereof is omitted.

(Method for Producing a Reversible Thermosensitive Recording Medium)

A method for producing a reversible thermosensitive recording medium of the present invention includes at least a step of forming a reversible thermosensitive recording layer, a step of forming a concave portion, a step of forming a first resin layer, and a step of providing an electronic information recording module, and further includes a step of forming a second resin layer and a bonding step, as necessary.

<Step of Forming a Reversible Thermosensitive Recording Layer>

The step of forming a reversible thermosensitive recording layer is a step of forming a reversible thermosensitive recording layer on a surface of the first sheet-shaped base.

A method for forming the reversible thermosensitive recording layer is not particularly limited, and can be appropriately selected depending on the intended purpose. The same method described in the reversible thermosensitive recording layer of the present invention can be employed as the method in the step of forming the reversible thermosensitive recording layer. Alternatively, the reversible thermosensitive recording layer has been preliminarily formed in a surface of the first sheet-shaped base may be used.

<Step of Forming a Concave Portion>

The step of forming a concave portion is a step of forming a concave portion on a surface of the first sheet-shaped base opposite to a surface thereof on which the reversible thermosensitive recording layer is formed.

A method for forming a concave portion is not particularly limited, and can be appropriately selected depending on the intended purpose. For example, any of a cutting process, a laser process, a press process and an etching process is preferably used. By these processes, the concave portion can be formed into a desired dimension with high precision.

The step of forming a first resin layer is a step of forming a first resin layer on the surface of the first sheet-shaped base on which the to concave portion is formed.

A method for forming the first resin layer is not particularly limited, and can be appropriately selected depending on the intended purpose. For example, a resin described in the reversible thermosensitive recording layer of the present invention can be used to form the first resin layer.

The step of providing an electronic information recording module is a step of bonding the first sheet-shaped base and an electronic information recording module containing an electronic information recording element and an antenna circuit on a module substrate via the first resin layer, and inserting the electronic information recording element into the concave portion so as to provide the electronic information recording module.

Here, the electronic information recording module is preferably provided by inserting the electronic information recording module into the concave portion so as to leave a gap between the first sheet-shaped base and the electronic information recording module in the depth direction of the concave portion.

As the electronic information recording module, those described in the reversible thermosensitive recording medium of the present invention can be used.

A method for positioning the electronic information recording element upon inserting the electronic information recording element into the concave portion is not particularly limited. For example, a method for adjusting the transfer speed of the electronic information recording module arranged on a transfer roller so as to position the electronic information recording element with the concave portion, is exemplified.

In the gap the third resin layer may be formed. In this case, the step of providing the electronic information recording module includes the step of forming third resin layer in the concave portion, wherein the electronic information recording element to be inserted into the concave portion is preferably bonded to the concave portion via the third resin layer.

A method for forming the third resin layer is not particularly limited and can be appropriately selected depending on the intended purpose. For example, the resin described in the reversible thermosensitive recording medium of the present invention can be used to form the third resin layer.

<Step of Forming a Second Resin Layer>

The step of forming a second resin layer is a step of forming a second resin layer on a surface of the second sheet-shaped base.

The step of forming a second resin layer is not particularly limited and can be appropriately selected depending on the intended purpose. For example, the resin described in the reversible thermosensitive recording medium of the present invention can be used to form the second resin layer.

<Bonding Step>

The bonding step is a step of bonding the second sheet-shaped base to the first sheet-shaped base and the electronic information recording module via the second resin layer so as to bond the second sheet-shaped base to the first sheet-shaped base.

In the bonding step, a unit for bonding the first sheet-shaped base and the second sheet-shaped base is not particularly limited and can be appropriately selected depending on the intended purpose. Known bonding methods for bonding two sheets are exemplified.

As the method for producing the reversible thermosensitive recording medium, the first resin layer is preferably formed so that the shortest distance between the antenna circuit and the first sheet-shaped base becomes 10 µm or more in the step of forming the first resin layer.

The reversible thermosensitive recording medium having such shortest distance is thin and has excellent flexibility while maintaining high bending durability and contact pressure resistance, and can prevent failure in color development at the time of repetitive image formation and erasure and prevent initial failure upon performing image formation once.

PRODUCTION EXAMPLE 1

Hereinafter, a method for producing a reversible thermosensitive recording medium will be described with reference to drawings.

FIGS. 27A to 27I show a production example of the reversible thermosensitive recording medium 7100 of the third embodiment of the present invention (Production Example 1).

Firstly, a reversible thermosensitive recording layer 73 formed on the first sheet-shaped base is prepared.

Next, a concave portion 710 is formed on a surface of the first sheet-shaped base opposite to a surface thereof on which the reversible thermosensitive recording layer 73 is formed.

A coating liquid for a first resin layer 711 as an adhesive is applied onto an area including the concave portion 710.

An electronic information recording module 78 is bonded to the first sheet-shaped base 71 via the first resin layer 711. Upon bonding, by adjusting the transfer speed of an electronic information recording module conveyed by a transfer roller 780, the electronic information recording module is positioned so that the an IC chip 77 is inserted into the concave portion.

Concurrently, a coating liquid for a second resin layer 712 as an adhesive is applied onto a second sheet-shaped base 72.

The second sheet-shaped base 72 coated with the second resin layer 712 is bonded to the first sheet-shaped base 71 and the electronic information recording module 78 in which the IC chip 77 is inserted into the concave portion via the second resin layer 712 so as to bond the first sheet-shaped base 71 and the second sheet-shaped base 72.

Next, using a cutting unit 781 the resultant product is cut into a reversible thermosensitive recording medium 7100, which includes the electronic information recording module 78.

PRODUCTION EXAMPLE 2

FIGS. 28A to 28J show a production example of the reversible thermosensitive recording medium 7300 of the fifth embodiment of the present invention (Production Example 2).

Production Example 2 is performed the same as in Production Example 1, except that a resin is filled into a concave portion 710 so as to form a third resin layer 733 before the first resin layer is formed.

PRODUCTION EXAMPLE 3

FIGS. 29A to 29I show a production example of h reversible thermosensitive recording medium 7400 of the sixth embodiment of the present invention (Production Example 3).

In Production Example 3, a material for forming the first resin layer is the same as that for forming the third resin layer, and the material is applied to form the first resin layer and the third resin layer simultaneously.

According to Production Example 3, the number of production steps can be decreased and production can be efficiently performed at low cost.

The reversible thermosensitive recording medium of the present invention has both the reversible thermosensitive recording layer and the electronic information recording element (IC chip), and information written in the IC chip is displayed on the reversible thermosensitive recording layer so as to easily confirm the information, and improve convenience. The reversible thermosensitive recording medium of the present invention can be widely used, for example, as gateway tickets, as stickers for frozen food containers, industrial products, drug containers, etc., and as a processed sheet having a size equivalent to that of a general document, for example, in logistics, process management and document management.

EXAMPLES

Hereinafter, Examples of the present invention will be described. However, these should not be construed as limiting the scope of the invention.

(Reversible Thermosensitive Recording Portion 1)

A first sheet-shaped base having a reversible thermosensitive layer (reversible thermosensitive recording sheet A, CR film 630BD, produced by Ricoh Company, Ltd., thickness: 188 µm) on a surface thereof was used. A concave portion was formed using a laser on a surface of the first sheet-shaped base opposite to the surface thereof on which the reversible thermosensitive recording layer (thickness: 30 µm) had been formed. The concave portion was formed to have a dimension large enough to house a convex-shaped electronic information recording element formed in an electronic information recording module to be inserted thereinto later (the concave portion having a length and width of 1.0 mm each and a depth of 110 µm). Here, the length and width of the concave portion are defined on the cross-section of the concave portion that is cut parallel to the surface of the reversible thermosensitive recording medium. An electronic information recording module was not mounted at the concave portion, and an adhesive was not applied to the concave portion, in order to compare printability of a flexible tag to that of a stiff tag, and to understand conditions for obtaining excellent printing, in other wards, confirming whether or not a gap having a size of a several millimeters or more causes a printing defect.

On the other hand, an adhesive was applied in a thickness of 80 µm to 85 µm onto a release paper having a uniform thickness, and then the release paper and the first sheet-shaped base were overlapped so that the side of the release paper onto which the adhesive had been applied faced the side of the first sheet-shaped base in which the concave portion had been formed. The overlapped release paper and firstsheet-shaped base were inserted between a pair of rollers, so that the adhesive flowed by the precision of a gap formed by the rollers and the surface properties of the rollers to thereby bond the release paper and the first sheet-shaped base. A reversible thermosensitive recording medium having the structure of FIG. 4, from which the electronic information recording module and the adhesive in the concave portion were omitted, was passed through a pair of rollers so as to have a uniform thickness. The bonding was performed under the conditions of causing no squeeze by the roller, and no adhesive flowing into the concave portion.

Next, after the release paper was removed, the reversible thermosensitive recording medium was cut into an appropriate size, so as to produce Reversible Thermosensitive Recording Portion 1 uniformly having a total thickness of 300 μm.

Next will be described in detail the reversible thermosensitive recording sheet A (a first sheet-shaped base having a reversible thermosensitive recording layer, CR film 630BD, produced by Ricoh Company, Ltd.) used for the production of Reversible Thermosensitive Recording Portion 1.
—Production of Reversible Thermosensitive Recording Layer—

The following components were pulverized and dispersed using a ball mill so as to have an average particle diameter of 0.1 μm to 1.0 μm.

| | |
|---|---|
| 2-anilino-3-methyl-6-dibutylaminofluoran (leuco dye) | 1 part by mass |
| Electron-accepting compound having the following structural formula (color developer) | 4 parts by mass |

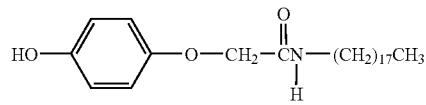

| | |
|---|---|
| Dialkylurea (produced by Nippon Kasei Chemical Co., Ltd., Hacreen SB) | 1 part by mass |
| 40% by mass acrylpolyol resin solution (produced by Mitsubishi Rayon Co., Ltd., LR327) | 10 parts by mass |
| Methyl ethyl ketnone | 80 parts by mass |

Subsequently, isocyanate (4 parts by mass) (Coronate HL, to produced by Nippon Polyurethane Industry Co., Ltd.) was added to the resultant dispersion liquid, followed by thoroughly stirring, to thereby prepare a coating liquid for forming a reversible thermosensitive recording layer. Thereafter, the resultant coating liquid was applied onto an opaque polyester film having a thickness of 100 μm (E28G, produced by TORAY INDUSTRIES INC.) using a wire bar, followed by drying at 100° C. for 2 min and then heating at 60° C. for 24 hours, to thereby form a reversible thermosensitive recording layer having a thickness of 12 μm to 13 μm (a single layer of the reversible thermosensitive recording layer without including a protective layer and an intermediate layer).
—Production of Protective Layer—

The following components were pulverized and dispersed using a ball mill so as to have an average particle diameter of 2 μm to 3 μm, to thereby prepare a coating liquid for forming a protective layer.
Compound having the following Structural Formula 4 parts by mass (1) (KAYARAD DPHA (solid content: 100% by mass), produced by Nippon Kayaku Co., Ltd.)
Compound having the following Structural Formula 21 parts by (2) (KAYARAD DPCA-60, produced by Nippon Kayaku mass Co., Ltd.)

The amount of the compound having Structural Formula (1): the amount of the compound having Structural Formula (2)=1.6:8.4

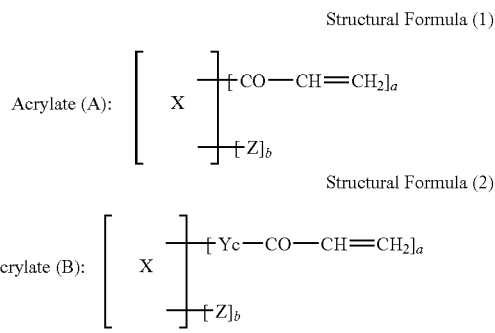

In Structural Formulas (1) and (2), X represents a pentaerythrithol group or a dipentaerythritol group, Y represents —$CH_2O$—, —$CH_2CH_2O$—, —$CH_2CH_2CH_2O$—, —$CH_2CH_2CH_2CH_2O$—, —$CH_2CH_2CH_2CH_2CH_2O$—, —$CH_2CH(CH_3)O$— or —$CO$—$CH_2CH_2CH_2CH_2CH_2O$—, and Z represents —H or —$CO$—$CH$=$CH_2$, a is 1 to 5, b is 1 to 5, and c is 1 to 12.

| | |
|---|---|
| Silica (P-526, produced by MIZUSAWA INDUSTRIAL CHEMICALS, LTD) | 2 parts by mass |
| Photopolymerization initiator (Irgacure 184, produced by Nihon Ciba-Geigy K.K.) | 1 part by mass |
| Isopropyl alcohol | 60 parts by mass |
| Toluene | 10 parts by mass |

The resultant coating liquid was applied onto the reversible thermosensitive recording layer using a wire bar, followed by drying under heating at 90° C. for 1 min. The thus-obtained product was irradiated with UV rays for crosslinking using an ultraviolet lamp at an irradiation energy of 80 W/cm to form a protective layer having a thickness of 3 μm, to thereby produce the reversible thermosensitive recording sheet A (CR film 630BD, produced by Ricoh Company, Ltd.).
(Reversible Thermosensitive Recording Portion 2)

Reversible Thermosensitive Recording Portion 2 was produced in the same manner as in Reversible Thermosensitive Recording Portion 1, except that the length and width of the concave portion were changed from 1.0 mm each to 1.5 mm each, and the depth of the concave portion was changed from 110 μm to 150 μm.
(Reversible Thermosensitive Recording Portion 3)

A first sheet-shaped base having a reversible thermosensitive layer (reversible thermosensitive recording sheet A, CR film 630BD, produced by Ricoh Company, Ltd., thickness: 188 μm) on a surface thereof was used. A concave portion was formed using a laser on a surface of the first sheet-shaped base opposite to the surface thereof on which the reversible thermosensitive recording layer (thickness: 30 μm) had been formed. The concave portion was formed to have a dimension for large enough to house a convex-shaped electronic information recording element formed in an electronic information recording module to be inserted thereinto later (concave portion having a length and width of 1.0 mm each and a depth of 110 μm).

An electronic information recording module was not mounted at the concave portion, and an adhesive was not applied to the concave portion, in order to compare printability of a flexible tag with that of a stiff tag, and to understand conditions for obtaining excellent printing, in other wards, confirming whether or not a gap having a size of a several millimeters or more causes a printing defect.

On the other hand, an adhesive was applied in a thickness of 130 µm to 135 µm onto a PET substrate having a thickness of 250 µm, and then the PET substrate and the first sheet-shaped base were overlapped so that the side of the PET substrate onto which the adhesive had been applied faced the side of the first sheet-shaped base in which the concave portion had been formed. The overlapped PET substrate and first-sheet-shaped base were inserted between a pair of rollers, so that the adhesive flowed by the precision of a gap formed by the rollers and the surface properties of the rollers to thereby bond the PET substrate and the first sheet-shaped base. A reversible thermosensitive recording medium having the structure of FIG. 4, from which the electronic information recording module and the adhesive in the concave portion were omitted, was passed through a pair of rollers so as to have a uniform thickness. The bonding was performed under the conditions causing no squeeze by the roller, and no adhesive flowing into the concave portion.

Next, the reversible thermosensitive recording medium was cut into an appropriate size, so as to produce Reversible Thermosensitive Recording Portion 3 uniformly having a total thickness of 600 µm.

(Reversible Thermosensitive Recording Portion 4)

Reversible Thermosensitive Recording Portion 4 was produced in the same manner as in Reversible Thermosensitive Recording Portion 3, except that the length and width of the concave portion were changed from 1.0 mm each to 1.5 mm each, and the depth of the concave portion was changed from 110 µm to 150 µm.

(Evaluation)

Reversible Thermosensitive Recording Portions 1 to 4 were evaluated as follows.

<Evaluation of Printing Qualiy>

—Comparison between Reversible Thermosensitive Recording Portion 1 and Reversible Thermosensitive Recording Portion 3—

Using a RP-K8520HF-5A1 printer (produced by SHINKO ELECTRIC CO., LTD.), a solid image was printed and erased on the reversible thermosensitive recording portions at a transfer speed of 3 IPS or 2 IPS and an erasing temperature of 170° C.

Reversible Thermosensitive Recording Portion 1 was evaluated by changing the length and width of the concave portion of the first sheet-shaped base sequentially from 0.7 mm each to 1.0 mm each, 1.5 mm each, 2.0 mm each, 2.5 mm each, 3.0 mm each, 3.5 mm each, 4.0 mm each, 5.0 mm each, and 6.0 mm each.

On the other hand, Reversible Thermosensitive Recording Portion 3 was evaluated by changing the length and width of the concave portion of the first sheet-shaped base sequentially from 0.7 mm each to 1.0 mm each, 1.5 mm each, 2.0 mm each, 2.5 mm each, 3.0 mm each, 3.5 mm each, 4.0 mm each, 5.0 mm each, and 6.0 mm each.

Figure 8:
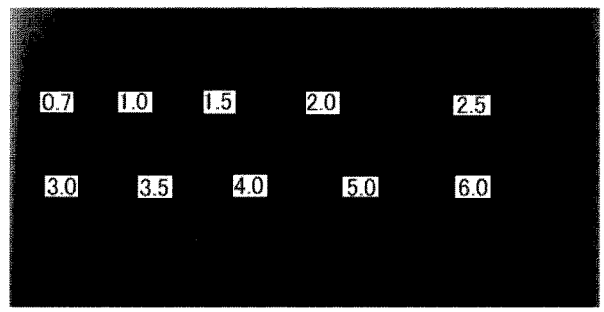
FIG. 8 is image data of a printed state of Reversible Thermosensitive Recording Portion 1 at a transfer speed of 3 IPS.
Figure 9:
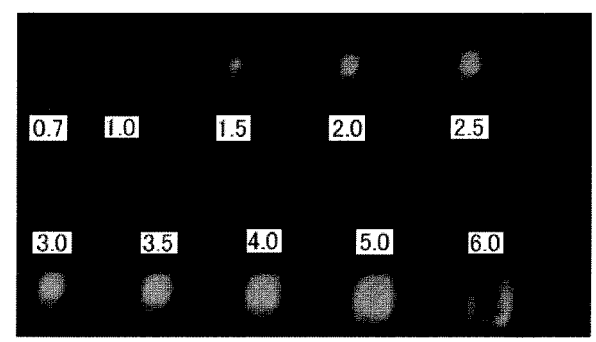
FIG. 9 is image data of a printed state of Reversible Thermosensitive Recording Portion 3 at a transfer speed of 3 IPS.

The printing conditions of Reversible Thermosensitive Recording Portion 1 and Reversible Thermosensitive Recording Portion 3 were visually observed, and evaluated according to the following evaluation criteria. The results are shown in Table 1-1. The image data of the printing state of Reversible Thermosensitive Recording Portion 1 at a transfer speed of 3 IPS are shown in FIG. 8, and the image data of the printing state of Reversible Thermosensitive Recording Portion 3 at a transfer speed of 3 IPS are shown in FIG. 9.

[Evaluation Criteria]

A: Excellent image was obtained, without unprinted portions and print fading.
B: Unprinted portions and print fading slightly observed.
C: Unprinted portions and print fading considerably observed.

—Comparison between Reversible Thermosensitive Recording Portion 2 and Reversible Thermosensitive Recording Portion 4—

The occurrence of white voids in Reversible Thermosensitive Recording Portion 2 and Reversible Thermosensitive Recording Portion 4 were evaluated in the same manner as in the method of comparison between Reversible Thermosensitive Recording Portion 1 and Reversible Thermosensitive Recording Portion 3, except that an object to be evaluated was changed as follows.

Reversible Thermosensitive Recording Portion 2 was evaluated by changing the length and width of the concave portion of the first sheet-shaped base from 1.0 mm each sequentially to 1.5 mm each, 2.0 mm each, 2.5 mm each, 3.5 mm each, 4.0 mm each, 5.0 mm each, and 6.0 mm each.

On the other hand, Reversible Thermosensitive Recording Portion 4 was evaluated by changing the length and width of the concave portion of the first sheet-shaped base sequentially from 1.0 mm each to 1.5 mm each, 2.0 mm each, 2.5 mm each, 3.5 mm each, 4.0 mm each, 5.0 mm each, and 6.0 mm each.

Figure 10:
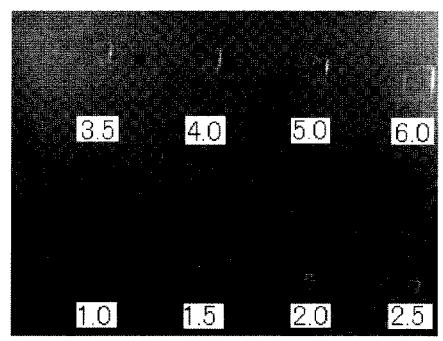
FIG. 10 is image data of a printed state of Reversible Thermosensitive Recording Portion 2 at a transfer speed of 3 IPS.
Figure 11:
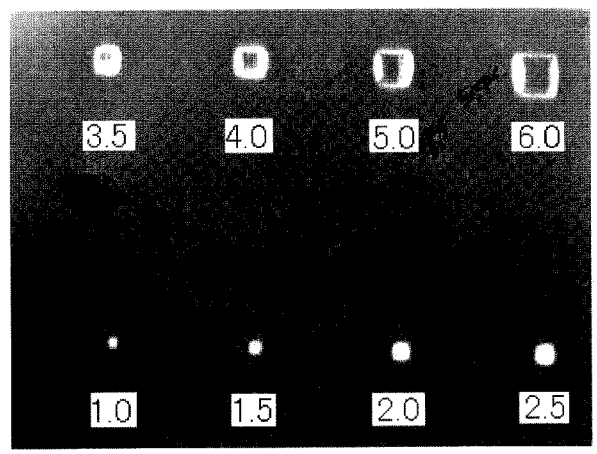
FIG. 11 is image data of a printed state of Reversible Thermosensitive Recording Portion 4 at a transfer speed of 3 IPS.

The results are shown in Table 1-2. The image data of the printing state of Reversible Thermosensitive Recording Portion 2 at a transfer speed of 3 IPS are shown in FIG. 10, and the image data of the printing state of Reversible Thermosensitive Recording Portion 4 at a transfer speed of 3 IPS are shown in FIG. 11.

TABLE 1-1

| Length and width of concave portion (mm each) | Printing at a transfer speed of 3 IPS | | Printing at a transfer speed of 2 IPS | |
|---|---|---|---|---|
| | Reversible Thermo-sensitive Recording Portion 1 | Reversible Thermo-sensitive Recording Portion 3 | Reversible Thermo-sensitive Recording Portion 1 | Reversible Thermo-sensitive Recording Portion 3 |
| | Printing quality | | Printing quality | |
| 0.7 | A | A | A | A |
| 1.0 | A | A | A | A |
| 1.5 | A | C | A | A |
| 2.0 | A | C | A | A |
| 2.5 | A | C | A | A |
| 3.0 | A | C | A | A |
| 3.5 | A | C | A | A |
| 4.0 | A | C | A | A |
| 5.0 | A | C | A | A |
| 6.0 | A | C | A | A |

TABLE 1-2

| Length and width of concave portion (mm each) | Printing at a transfer speed of 3 IPS | | Printing at a transfer speed of 2 IPS | |
|---|---|---|---|---|
| | Reversible Thermo-sensitive Recording Portion 2 | Reversible Thermo-sensitive Recording Portion 4 | Reversible Thermo-sensitive Recording Portion 2 | Reversible Thermosensitive Recording Portion 4 |
| | Printing quality | | Printing quality | |
| 1.0 | A | C | A | A |
| 1.5 | A | C | A | A |
| 2.0 | B | C | A | A |

TABLE 1-2-continued

|  | Printing at a transfer speed of 3 IPS | | Printing at a transfer speed of 2 IPS | |
| --- | --- | --- | --- | --- |
| Length and width of concave portion (mm each) | Reversible Thermosensitive Recording Portion 2 Printing quality | Reversible Thermosensitive Recording Portion 4 Printing quality | Reversible Thermosensitive Recording Portion 2 Printing quality | Reversible Thermosensitive Recording Portion 4 Printing quality |
| 2.5 | B | C | A | A |
| 3.5 | B | C | A | A |
| 4.0 | B | C | A | A |
| 5.0 | B | C | A | A |
| 6.0 | B | C | A | A |

As can be seen from Table 1-1, Reversible Thermosensitive Recording Portion 1 was superior in printing quality to Reversible Thermosensitive Recording Portion 3.

As shown in FIG. 8, clear black prints were obtained on Reversible Thermosensitive Recording Portion 1 in all the lengths and widths of the concave portion, from 0.7 mm each to 6.0 mm each.

On the other hand, as shown in FIG. 9, clear black prints was obtained on Reversible Thermosensitive Recording Portion 3 having the small size concave portion, i.e., the length and width of the concave portion were 0.7 mm each, and 1.0 mm each, but not on Reversible Thermosensitive Recording Portion 3 having the length and width of the concave portion larger than 1.0 mm each, causing printing defects.

As can be seen from Table 1-2, Reversible Thermosensitive Recording Portion 2 was superior in printing quality to Reversible Thermosensitive Recording Portion 4.

As shown in FIG. 10, black prints were obtained on Reversible Thermosensitive Recording Portion 2 in all the lengths and widths of the concave portion from 1.0 mm each to 6.0 mm each. In particular, clear black prints were obtained on Reversible Thermosensitive Recording Portion 2 having the concave portion having the length and width of 1.0 mm each and 1.5 mm each.

On the other hand, as shown in FIG. 11, black prints were not obtained on Reversible Thermosensitive Recording Portion 4 in all the lengths and widths of the concave portion from 1.0 mm each to 6.0 mm each, causing printing defects.

As shown in the results of Tables 1-1 and 1-2, particularly excellent printing quality could be obtained in the reversible thermosensitive recording medium, wherein the concave portion had a depth of 110 μm or less, and the width of a gap (i.e., the distance between a side surface of the concave portion and a side surface of the electronic information recording element) formed in a state that an IC chip (electronic information recording element) was inserted into the concave portion was 6.0 mm or less, and in the reversible thermosensitive recording medium, wherein the concave portion had a depth of 150 μm or less, and the width of a gap (i.e., the distance between a side surface of the concave portion and a side surface of the electronic information recording element) formed in a state that an IC chip (electronic information recording element) was inserted into the concave portion was 1.5 mm or less.

As can be seen from the results of Tables 1-1 and 1-2, in the case of the transfer speed of 2 IPS, there was no problem with the printing quality of Reversible Thermosensitive Recording Portions 1 to 4. On the other hand, in the case of the transfer speed of 3 IPS, Reversible Thermosensitive Recording Portions 1 and 2 had excellent printing quality.

Example A-1

—Production of Reversible Thermosensitive Recording Medium—

On the basis of the structures of Reversible Thermosensitive Recording Portions 1 and 2, a reversible thermosensitive recording medium in Example A-1 was produced as follows.

A first sheet-shaped base having a reversible thermosensitive layer (reversible thermosensitive recording sheet A, CR film 630BD, produced by Ricoh Company, Ltd., thickness: 188 μm) on a surface thereof was used. A concave portion was formed using a laser on the surface of a first sheet-shaped base opposite to the surface thereof on which the reversible thermosensitive recording layer (thickness: 30 μm) had been formed. The concave portion was formed to have a dimension large enough to house a convex-shaped electronic information recording element formed in an electronic information recording module to be inserted thereinto later (the concave portion having an length and width of 2.7 mm each and a depth of 150 μm).

The concave portion was formed so that the dimension of the concave portion was larger than that of the electronic information recording element (in the width direction of the concave portion, the distance between a side surface of the concave portion and a side surface of the electronic information recording element was 0.75 mm to 1.5 mm), and the depth of the concave portion was equal to or smaller than that of the electronic information recording element (in the depth direction of the concave portion, the distance from the bottom of the concave portion to the top of the electronic information recording element was 0 μm) depending on the length and width and height of the electronic information recording element.

Next, an adhesive was previously applied onto an entire area in which the electronic information recording module would be mounted within the surface of the first sheet-shaped base, and then the electronic information recording element was inserted into the concave portion so as to mount the electronic information recording module on the first sheet-shaped base via a first resin layer. Here, the adhesive was not applied to the inner wall of the concave portion.

On the other hand, an adhesive was applied in a thickness of 80 μm to 85 μm onto a release paper having a uniform thickness, and then the release paper and the first sheet-shaped base were overlapped so that the side of the release paper onto which the adhesive had been applied faced the side of the first sheet-shaped base in which the electronic information recording module had been formed. The overlapped release paper and first-sheet-shaped base were inserted between a pair of rollers, so that the adhesive flowed by the precision of a gap formed by the rollers and the surface properties of the rollers to thereby bond the release paper and the first sheet-shaped base. By passing between the rollers, the reversible thermosensitive recording medium having the structure of FIG. 4 formed in a uniform thickness was produced.

Next, after the release paper was removed, the obtained product was cut into an appropriate size, so as to produce a reversible thermosensitive recording medium of Example A-1 having a total thickness of 300 μm in a uniform shape.

The back surface of the reversible thermosensitive recording medium of Example A-1 was the adhesive surface on which the surface roughness of the release paper was transferred after the release paper had been removed. Here, the back surface was a surface of the reversible thermosensitive recording medium opposite to a surface on which a reversible thermosensitive recording layer was formed. As the release paper to be used, the release paper having a surface roughness $R_{max}$ of approximately 13 μm was selected from the conditions of the surface roughness of 7 μm or more. Thus, the surface roughness $R_{max}$ of the back surface was 13 μm to 15 μm (see Table 7).

Comparative Example A-1

Figure 16:
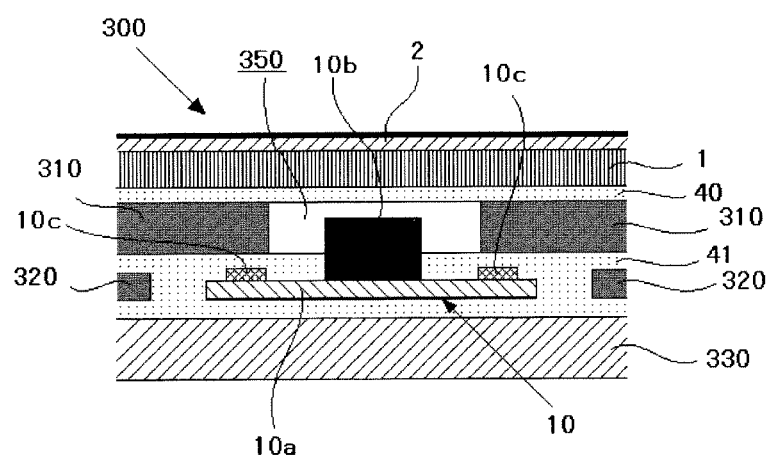
FIG. 16 is a cross-sectional view showing another example of a conventional reversible thermosensitive recording medium.
Figure 17A:
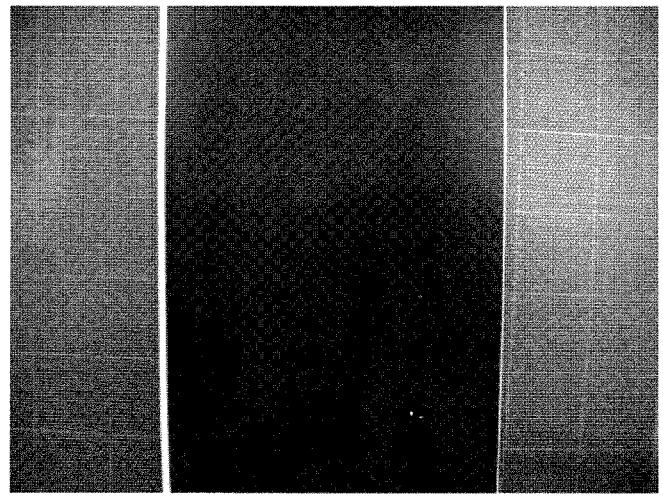
FIG. 17A is image data showing a printed state of a solid image (solid black) of the reversible thermosensitive recording medium of Example A-1.
Figure 17B:
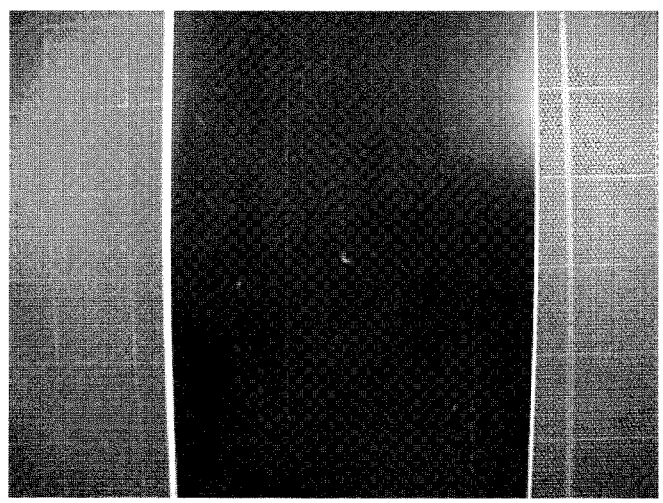
FIG. 17B is image data showing a printed state of a half tone image of the reversible thermosensitive recording medium of Example A-1.
Figure 18A:
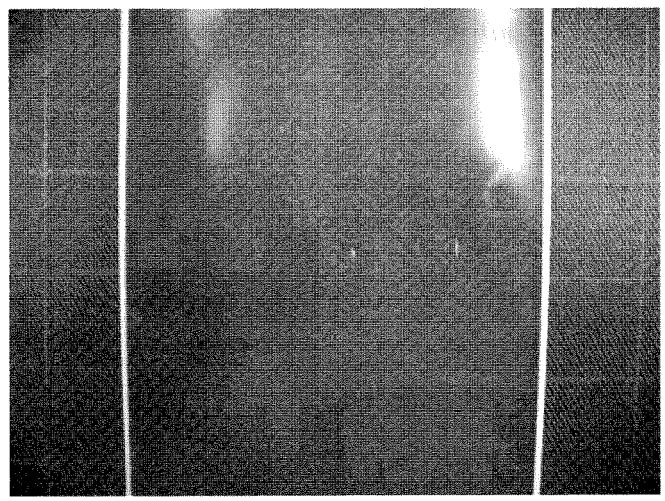
FIG. 18A is image data showing a printed state of a solid image (solid black) of the reversible thermosensitive recording medium of Comparative Example A-1.
Figure 18B:
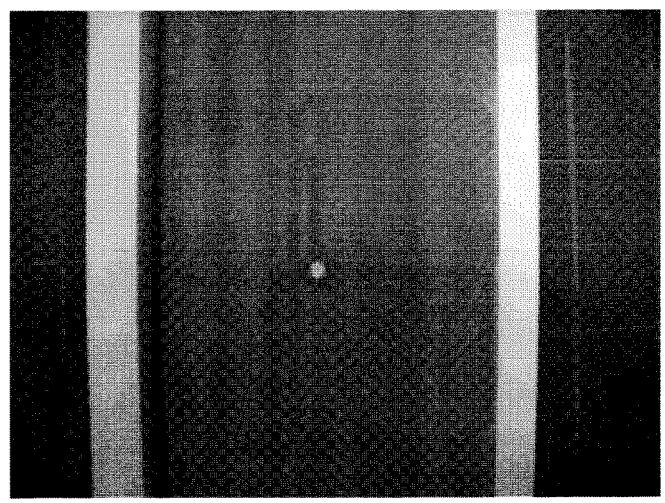
FIG. 18B is image data showing a printed state of a half tone image of the reversible thermosensitive recording medium of Comparative Example A-1.

Next, as Comparative Example A-1, a reversible thermosensitive recording medium 300 (see FIG. 16) produced under the conditions disclosed in JP-A No. 2008-229911 will be described. The reversible thermosensitive recording medium 300 has an IC chip projecting through a through-hole of a core sheet toward the reversible thermosensitive recording layer.

Firstly, a core sheet 310 (CRISPER PET K1212, produced by Toyobo Co., Ltd.) having an adhesive layer 40 was prepared so as to have a through-hole 350 having a size large enough to house an IC chip 10b of the electronic information recording sheet 10 having one of adhesive layers 41. In the adhesive layers 41, a sheet 320 (CRISPER PET K1212, produced by Toyobo Co., Ltd.) was located and had a cut-out portion such that the area of the electronic information recording sheet 10 could be housed. Next, via one of the adhesive layers 41 serving as a base of the lowermost part of the layer structure a base sheet for medium 330 (white PET E-28G, produced by TORAY INDUSTRIES INC.) was provided, and the sheet 320 was bonded to the base sheet for medium 330 by the rollers, so as to house the IC chip 10b of the electronic information recording sheet 10 in the through-hole 350 of the core sheet 310.

Moreover, a first sheet-shaped base 1, on which surface a reversible thermosensitive recording layer 2 (thickness: 30 μm) as an outermost layer had been provided (reversible thermosensitive recording sheet A, CR film 630BD, produced by Ricoh Company, Ltd., thickness: 130 μm), was bonded via the adhesive layer 40 onto the core sheet 310 in which the through-hole 350 had been formed. Upon bonding, pressure was applied using the rollers to the degree not to destroy the IC chip. The five sheets were bonded and had a total thickness of 600 μm, and the resultant product was cut into a piece having an appropriate size, to thereby produce a reversible thermosensitive recording medium of Comparative Example A-1.

The back surface of the reversible thermosensitive recording medium of Comparative Example A-1 was PET base sheet for medium, and the base itself was smooth, and the surface roughness of the back surface $R_{max}$ was 3.5 μm. Here, the back surface was a surface of the reversible thermosensitive recording medium opposite to a surface on which a reversible thermosensitive recording layer was formed.

The following condition was the same as that of Example A-1, for comparison with Example A-1.

The length and width of a through-hole concave portion were 2.7 mm each, and the depth of the through-hole concave portion was 150 μm.

The distance between a side surface of the concave portion and a side surface of the electronic information recording element in the width direction of the concave portion was 0.75 mm to 1.5 mm, and the depth from the bottom of the concave portion to the top of the electronic information recording element in the depth direction of the concave portion was 0 μm.

(Evaluation for Occurrence of White Voids)

Example A-1 and Comparative Example A-1

Using the RP-K8520HF-5A1 printer (produced by SHINKO ELECTRIC CO., LTD.), at a transfer speed of 3 IPS and an erasing temperature of 170° C., a solid image was printed and erased on the reversible thermosensitive recording medium by setting a color gradation 255, and a half tone image was printed and erased thereon by setting a color gradation 123. Subsequently, printed image areas were visually observed and evaluated, each area corresponding to the IC chip, the antenna circuit, the conductive member, and the surrounding area of the inlet, according to the following evaluation criteria. The results are shown Table 2.

[Evaluation Criteria]

A: Excellent image was obtained, without unprinted portions and image fading.

B: Unprinted portions and image fading were slightly observed.

C: Unprinted portions and image fading were considerably observed.

TABLE 2

| Image quality of solid black (sample of half tone image) | Ex. A-1 | Comp. Ex. A-1 |
| --- | --- | --- |
| White void in an IC chip area | A (B) | C (C) |
| White void in a surrounding area of an inlet | A (A) | A (B) |
| White void in an antenna circuit and conductive member | A (A) | A (C) |

The evaluation in blankets show an evaluation of a printed state of a half tone image.

(Evaluation of Shape Recovery Time)

Shape recovery times of the reversible thermosensitive recording media of Example A-1 and Comparative Example A-1 were measured and evaluated.

The shape recovery time was measured in such a manner that an initial curling of the reversible thermosensitive recording medium was measured in advance, and both edges of the reversible thermosensitive recording medium were held with fingers to fold it, and then the time required for returning the folded part to the initial curling was measured. The results are shown in Table 3.

TABLE 3

| | Shape recovering time (s) | |
| --- | --- | --- |
| | The case where a reversible thermosensitive recording layer was folded upward. | The case where a reversible thermosensitive recording layer was folded downward. |
| Example A-1 | 1 | 8 |
| Comparative Example A-1 | 300 | 420 |

As shown in Table 3, the shape recovering time of Example A-1 was shorter than that of Comparative Example A-1, and excellent shape recovering properties could be obtained in Example A-1.

Thus, even if any curling or surface waviness is caused by holding or nipping a reversible thermosensitive recording medium at the time when the reversible thermosensitive recording medium is fed into a printer for printing or erasing, the reversible thermosensitive recording medium is supplied for printing or erasing at the state where the shape thereof is recovered. Thus, the problems of printing defect, feeding failure, and jam can be solved.

(Evaluation of Handling and Bending Durability I)

The size of the reversible thermosensitive recording media of Example A-1 and Comparative Example A-1 were adjusted to the size of those usually used, i.e. 200 mm long and 105 mm wide. Then, the bending durability and handling thereof were evaluated.

Specifically, each of the reversible thermosensitive recording medium having a length of 200 mm was folded longitudinally in half, and curled, and then the folded reversible thermosensitive recording medium having 100 mm long and 105 mm wide was pressed until at the center portion thereof a right half surface and a left half surface were brought into close contact, and press force (gf) was measured using a clamping force measuring instrument. Moreover, the minimum curvature of the curled portion of the center-folded reversible thermosensitive recording medium was measured using a radius (mm) gauge, and then evaluated. The results are shown in Table 4.

Figure 12:
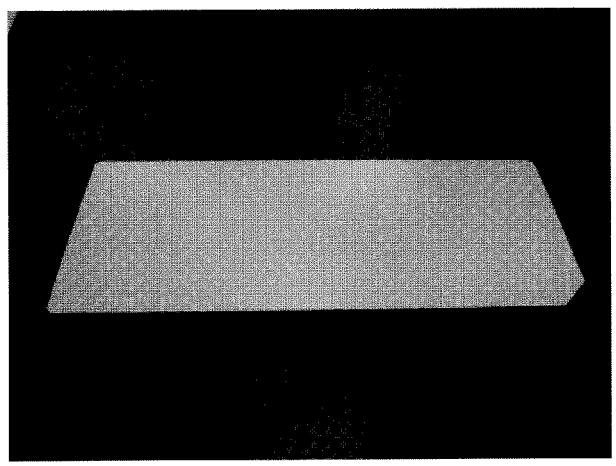
FIG. 12 is image data of a reversible thermosensitive recording medium in a recovered state of Example A-1
Figure 13:
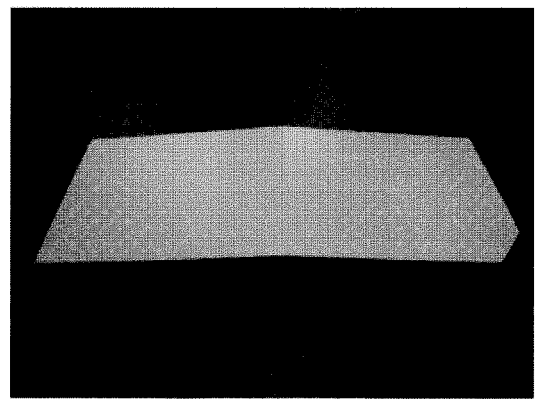
FIG. 13 is image data of a reversible thermosensitive recording medium in a recovered state of Comparative Example A-1.
Figure 14:
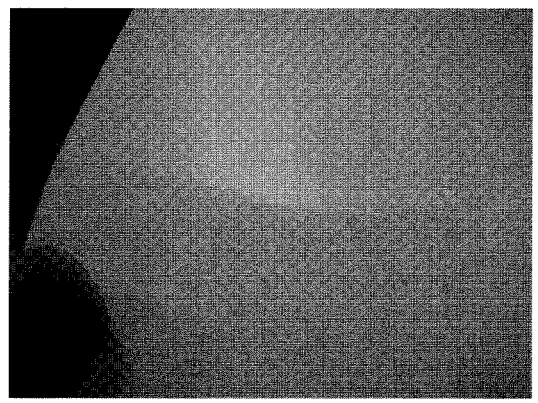
FIG. 14 is enlarged image data of a half-folded portion in FIG. 13.
Figure 15:
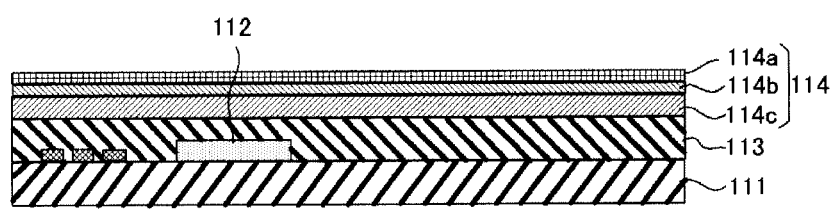
FIG. 15 is a cross-sectional view showing an example of a conventional reversible thermosensitive recording medium.

The image data of the reversible thermosensitive recording medium of Example A-1 in the recovered state after measurement is shown in FIG. 12. The image data of the reversible thermosensitive recording medium of Comparative Example A-1 in the recovered state after measurement is shown in FIG. 13. FIG. 14 shows an enlarged image data of the half-folded portion in FIG. 13.

TABLE 4

| | Press force (gf) | Curvature when surfaces are in close contact state R (mm) | Curling |
|---|---|---|---|
| Example A-1 | 120 | 9.0 | Flexible and circular curling |
| Comparative Example A-1 | 3,100 | 3.0 | Broken |

As can be seen from Table 4, the press force (gf) of Example A-1 was lower than that of Comparative Example A-1, and the reversible thermosensitive recording medium of Example A-1 was excellent in shape variation. Thus, the reversible thermosensitive recording medium of Example A-1 fitted comfortably in hands when it was held, and had excellent handling.

The maximum curvature of the curling part of the center-folded reversible thermosensitive recording medium of Example A-1 was larger than that of Comparative Example A-1, and the reversible thermosensitive recording medium of Example A-1 could obtain a flexible and circular curling. Moreover, as shown in FIG. 12, the reversible thermosensitive recording medium of Example A-1 had no impression after recovered, and returned to a flat shape. However, as shown in FIGS. 13 and 14, in the reversible thermosensitive recording medium of Comparative Example A-1, bend (kink streak, bend height: 10 mm) remained after recovered, and the reversible thermosensitive recording medium became unusable.

As stated above, even though the reversible thermosensitive recording medium of Example A-1 was held upon placing it on a flat surface, or pulling it out from a tag holder on a box surface, it was not locally curved, broken, cracked, and the shape thereof flexibly varied according to the shape variation upon holding. Thus, the deterioration in the quality thereof was not caused by stress concentration to a caulking portion, and handling thereof was improved.
(Evaluation of Warpage, Punching)

Using the adhesive (a PUR-HM adhesive, perfect lock MR900RI produced by Henkel Technologies Japan Ltd.) which could keep a viscosity of 100,000 cps or less at 60° C. to 90° C., while the temperature of application and bonding of the first resin layer to 60° C. to 90° C. was adjusted, low temperature process was performed, so as to prevent the curling and surface waviness of the base due to heating upon processing, and to decrease the contraction of adhesive at the same time. Thus, the curling amount was reduced.

Table 5 shows the results of warpage of the reversible thermosensitive recording medium of Example A-1 measured in the following manner. Specifically, in the reversible thermosensitive recording medium of Example A-1, a porous PET (CRISPER K2323, produced by Toyobo Co., Ltd, thickness: 188 μm) was used as a first sheet-shaped base, and the adhesive (a PUR-HM adhesive, perfect lock MR900RI produced by Henkel Technologies Japan Ltd.) was applied in a thickness of 80 μm onto a surface of the first sheet-shaped base opposite to a surface thereof on which the reversible thermosensitive recording layer had been formed under the conditions of temperatures of 70° C., 80° C., 100° C., and 130° C., to thereby obtain a total thickness of 300 μm, and then the warpage of the reversible thermosensitive recording medium having 200 mm long and 85 mm wide was measured.

Figure 19:
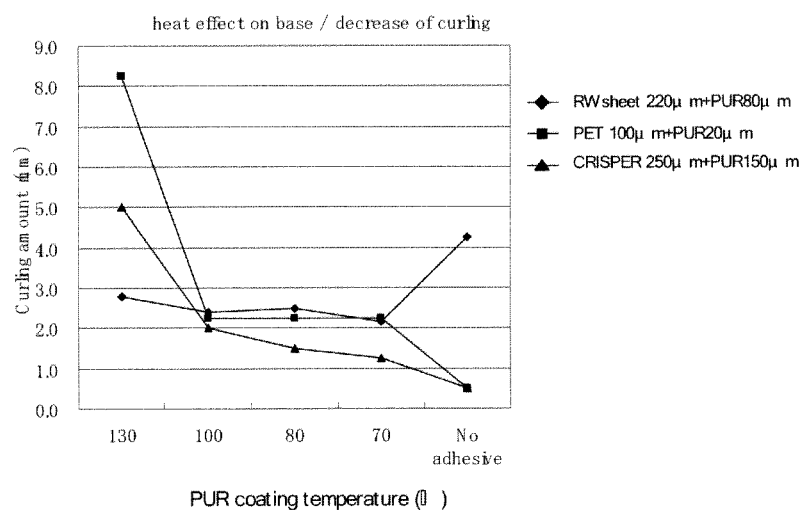
FIG. 19 is a graph showing a relation between a coating temperature of an adhesive and a curling amount.
Figure 20:
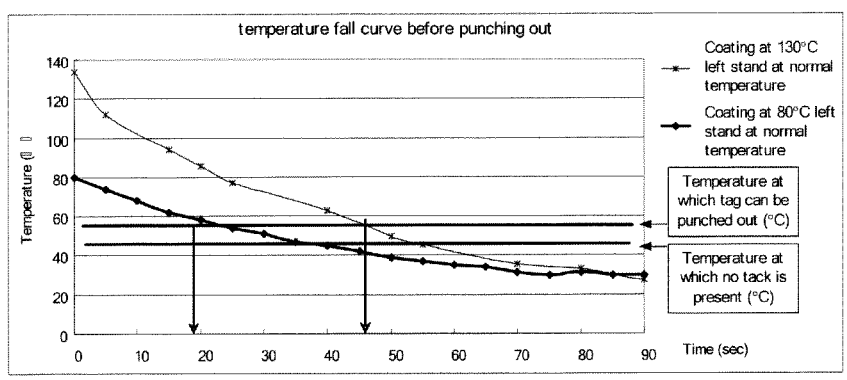
FIG. 20 is a graph showing decrease in temperature based on the course of time.

FIG. 19 is a graph showing the relation between the coating temperature of the adhesive and the curling amount. The results of the evaluation of warpage are shown by a line of reversible thermosensitive recording sheet 220 μm+PUR 80 μm. When the lower the coating temperature was, the lower the warpage value became and the better value was shown.

Meanwhile, the same warpage test was performed on media respectively using the combination of PET (white PET E-28G, produced by TORAY INDUSTRIES INC.) 100 μm and PUR 20 μm, and the combination of CRISPER porous PET base 250 μm and PUR 150 μm. As shown in Table 6 and FIG. 19, when the lower the coating temperature was, the lower the warpage value became, and the better value was shown.
Method for Evaluating Warpage A tag sample was placed on a flat pedestal and was pressed onto a plane, firstly when the thickness of the tag was 0 mm in height. This was input in a laser displacement gauge LK-G155 (produced by KEYENCE CORPORATION), and then 6 points on the tag sample having 200 mm long and 85 mm wide, (3 points long in the longitudinal direction and 2 points wide in the width direction along edges of the tag sample were measured without load, so as to evaluate the warpage. The maximum value out of these 6 points was taken as the warpage value.
Evaluation of Punching Using the hot melt adhesive (a PUR-HM adhesive, perfect lock MR900RI produced by Henkel Technologies Japan Ltd.) for bonding, with respect to a sample having a structure of Example A-1, evaluation was made to determine how much time was required until punch-out could be performed after application of the adhesive (hereinafter referred to as the amount of time required for punching) was evaluated by changing the coating temperature of the hot melt adhesive.

The punching was evaluated by comparison of the amount of time required for cooling down a tag surface from the coating temperature to 58° C. or lower, at which the adhesive was solidified and the tag could be punched out.

In the conventional structure, the time required for punching was 48 seconds, when the tag was coated with the adhesive at 130° C. On the other hand, in the structure of the present invention, the time required for punching was 18 seconds or less when the tag was coated with the adhesive at 80° C. The time required for punching could be shorten. Consequently, the operation of a device could be decreased, and a space for installation and a cost of the device could be reduced.

TABLE 5

| | Curling amount (mm) CRISPER 188 μm in thick | | Viscosity |
| --- | --- | --- | --- |
| | Coated amount 80 μm | Adhesive state | (cps) |
| 130° C. | 2.80 | extended | 3,000 |
| 100° C. | 2.40 | extended | 9,500 |
| 80° C. | 2.50 | extended | 20,000 |
| 70° C. | 2.15 | extended | 52,000 |
| No adhesive | 4.25 | — | — |

TABLE 6

| | Curling amount (mm) | | | |
| --- | --- | --- | --- | --- |
| | PET 100 μm | CRISPER 250 μm in thick | | |
| | Coated amount 20 μm | Coated amount 150 μm | Adhesive state | Viscosity (cps) |
| 130° C. | 8.25 | 5.00 | extended | 3,000 |
| 100° C. | 2.25 | 2.00 | extended | 9,500 |
| 80° C. | 2.25 | 1.50 | extended | 20,000 |
| 70° C. | 2.25 | 1.25 | extended | 52,000 |
| No adhesive | 0.50 | 0.50 | — | — |

(Back Surface Roughness $R_{max}$ and Adhesion Tensile Force)

The back surface roughness $R_{max}$ and adhesion tensile force of the reversible thermosensitive recording media of Example A-1 and Comparative Example A-1, and a typical antistatic coated PET sheet as reference were measured. The results are shown in Table 7. The tag sample having 200 mm long and 85 mm wide was measured. The reversible thermosensitive recording medium of Example A-1 was measured twice (A, B).

TABLE 7

| | | Back surface roughness Rmax (μm) | adhesion tensile force (N) |
| --- | --- | --- | --- |
| Example | A | 13.8 | 2.0 |
| A-1 | B | 14.4 | 2.5 |
| Comparative Example A-1 | | 3.5 | 11.0 |
| Reference | | 2.0 | 15.0 |

As shown in Table 7, the reversible thermosensitive recording medium of Example A-1 was obtained in a preferable range of the back surface roughness, from 7 μm to 70 μm. The adhesion tensile force of the reversible thermosensitive recording medium of Example A-1 could be decreased, compared to the reversible thermosensitive recording medium of Comparative Example A-1, and the reference.

(Evaluation of Flexibility)

The flexibility of the reversible thermosensitive recording portions 1 and 4, and the reversible thermosensitive recording media of Example A-1 and Comparative Example A-1 were evaluated as follows.

Method for Measuring Flexibility

A tag sample having 200 mm long and 85 mm wide was placed flatly with no load over two rectangular pedestals, which were located in parallel with a space of 100 mm therebetween. At the center (the point of 50 mm of the space 100 mm between the pedestals and the center of the width 85 mm of the tag) the tag placed flatly was pressed from upward to downward, using a typical spring balancer (Maximum 500 gf, a pressing probe rod having a diameter of 3 mm), and when the tag was deformed 10 mm downward in the height direction a load was measured (see FIG. 32).

—Measurement Results—

| Example A-1 | 19 gf |
| --- | --- |
| Comparative Example A-1 | 167 gf |
| Reversible Thermosensitive Recording Portion 1 | 19 gf |
| Reversible Thermosensitive Recording Portion 2 | 18 gf |
| Reversible Thermosensitive Recording Portion 3 | 165 gf |
| Reversible Thermosensitive Recording Portion 4 | 163 gf |

As can be seen from the above results, the medium of the present invention having the structure in which the concave portion was formed in the first sheet-shaped base could obtain excellent flexibility.

Example B-1

On a surface of a roll-shaped first PET sheet (a first sheet-shaped base), the reversible thermosensitive recording sheet on which a reversible thermosensitive recording layer was formed as described below, was provided.

A reversible thermosensitive recording sheet A (a base sheet having a reversible thermosensitive recording layer, CR film 630BD, produced by Ricoh Company, Ltd., thickness: 188 μm) was used. The details thereof will be described below.

—Production of Reversible Thermosensitive Recording Layer—

The following components were pulverized and dispersed using a ball mill so as to have an average particle diameter of 0.1 μm to 1.0 μm.

| 2-Anilino-3-methyl-6-dibutylaminofluoran (leuco dye) | 1 part by mass |
| --- | --- |
| Electron-accepting compound having the following structural formula (color developer) | 4 parts by mass |

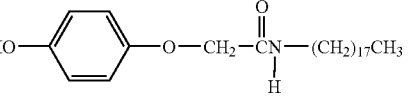

| Dialkylurea (Hacreen SB, produced by Nippon Kasei Chemical Co., Ltd.) | 1 part by mass |
| --- | --- |
| 40% by mass acrylpolyol resin solution (LR327, produced by Mitsubishi Rayon Co., Ltd.) | 10 parts by mass |
| Methyl ethyl ketnone | 80 parts by mass |

Subsequently, isocyanate (4 parts by mass) (Coronate HL, produced by Nippon Polyurethane Industry Co., Ltd.) was added to the resultant dispersion liquid, followed by thoroughly stirring, to thereby prepare a coating liquid for forming a reversible thermosensitive recording layer. Thereafter, the resultant coating liquid was applied onto a base sheet having a thickness of 188 μm (CRISPER, produced by Toyobo Co., Ltd.) using a wire bar, followed by drying at 100° C. for 2 min and then heating at 60° C. for 24 hours, to thereby form a reversible thermosensitive recording layer having a thickness of 12 μm to 13 μm.

—Production of Protective Layer—

The following components were pulverized and dispersed using a ball mill so as to have an average particle diameter of 2 μm to 3 μm, to thereby produce a coating liquid for forming a protective layer.

Compound having the following Structural Formula 4 parts by mass (1) (KAYARAD DPHA (solid content: 100% by mass), produced by Nippon Kayaku Co., Ltd.)

Compound having the following Structural Formula 21 parts by mass (2) (KAYARAD DPCA-60, produced by Nippon Kayaku Co Ltd.)

The amount of the compound having Structural Formula (1): the amount of the compound having Structural Formula (2)=1.6:8.4

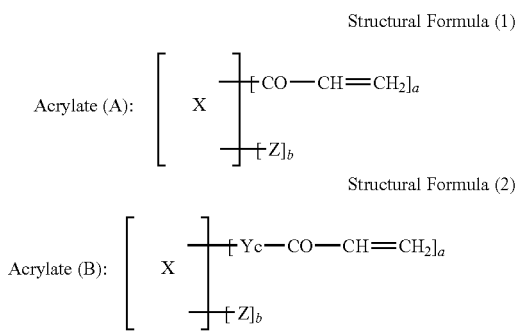

Structural Formula (1)

Structural Formula (2)

In Structural Formulas (1) and (2), X represents a pentaerythrithol group or a dipentaerythritol group, Y represents —$CH_2O$—, —$CH_2CH_2O$—, —$CH_2CH_2CH_2O$—, —$CH_2CH_2CH_2CH_2O$—, —$CH_2CH_2CH_2CH_2CH_2O$—, —$CH_2CH(CH_3)O$— or —$CO$—$CH_2CH_2CH_2CH_2CH_2O$—, and Z represents —H or —$CO$—$CH$=$CH_2$, a is 1 to 5, b is 1 to 5, and c is 1 to 12.

| | |
|---|---|
| Silica (P-526, produced by MIZUSAWA INDUSTRIAL CHEMICALS, LTD.) | 2 parts by mass |
| Photopolymerization initiator (Irgacure 184, produced by Nihon Ciba-Geigy K.K.) | 1 part by mass |
| Isopropyl alcohol | 60 parts by mass |
| Toluene | 10 parts by mass |

The resultant coating liquid was applied onto the reversible thermosensitive recording layer using a wire bar, followed by drying under heating at 90° C. for 1 min. The thus-obtained product was irradiated with UV rays for crosslinking using an ultraviolet lamp at an irradiation energy of 80 W/cm to form a protective layer having a thickness of 3 μm, to thereby produce the reversible thermosensitive recording sheet A (CR film 630BD, produced by Ricoh Company, Ltd.).

A concave portion having a diameter of 7 mm was formed by cutting out on a surface of the reversible thermosensitive recording sheet A, opposite to a surface thereof on which the reversible thermosensitive recording layer was formed.

After the concave portion was formed, a hot melt adhesive A (BOND MASTER 170-7310, produced by Nippon NSC Ltd.) was applied on the first PET sheet by roll coating (a first resin layer).

The hot melt adhesive A was applied in a thickness larger than the height of an antenna wiring of an electronic information recording module by 10 μm or more (15 μm).

The elastic modulus of the hot melt adhesive A was 700 MPa, and smaller than the elastic modulus of a PET sheet, which was 4,000 MPa.

Using the hot melt adhesive A, an electronic information recording module was bonded to a first sheet-shaped base by roll pressing so that an IC chip could be housed in the concave portion formed in the first sheet-shaped base. Here, as the electronic information recording module, an electronic information recording module A (RKT132, produced by Hitachi, Ltd.), which had a module substrate, an antenna circuit provided on the substrate and an IC chip fixed on the antenna circuit board with bump and underfill.

The electronic information recording module was bonded to the first sheet-shaped base, so that the shortest distance from the height of the antenna circuit of the bonded electronic information recording module to the first PET sheet became 10 μm or longer.

Moreover, the electronic information recording module was bonded to the first sheet-shaped base, so that in the depth direction of the concave portion, the height from the top of the IC chip to the bottom of the concave portion became 5 μm to 50 μm.

A hot melt adhesive B (BOND MASTER 170-7141, produced by so Nippon NSC Ltd.) was applied in a thickness of 150 μm by roll coating onto a surface of a roll-shaped second PET sheet (CRISPER, a second sheet-shaped base, produced by Toyobo Co., Ltd.) to be provided on a back surface of a medium (a second resin layer).

The thickness of the second PET sheet was 38 μm.

The elastic modulus of the hot melt adhesive B was 700 MPa, and was the same as the elastic modulus of the hot melt adhesive A.

The second PET sheet onto which the hot melt adhesive B was applied was bonded by roll pressing to the first PET sheet on which the electronic information recording module had been bonded.

After the first PET sheet was bonded to the second PET sheet, the bonded sheet was cut into a desired size, such as an IC card, IC tag, etc. using a die, to thereby produce a reversible thermosensitive recording medium of Example B-1.

Example B-2

A reversible thermosensitive recording medium of Example B-2 was produced in the same manner as in Example B-1, except that the hot melt adhesive B was replaced with a hot melt adhesive C (BOND MASTER 170-7254, produced by Nippon NSC Ltd., the elastic modulus was 250 MPa, and the elastic modulus of the hot melt adhesive C was smaller than that of the hot melt adhesive A).

Example B-3

A reversible thermosensitive recording medium of Example B-3 was produced in the same manner as in Example B-2, except that a concave portion was formed on a surface of the first PET sheet opposite to a surface thereof, on which a reversible thermosensitive recording layer was formed, and into the concave portion, a hot melt adhesive D (BOND MASTER 170-7254SB, produced by Nippon NSC Ltd., the elastic modulus was 700 MPa, and the elastic modulus of the hot melt adhesive D was smaller than that of the first PET sheet, a third resin layer) was applied.

Example B-4

A reversible thermosensitive recording medium of Example B-4 was produced in the same manner as in Example B-1, except that a concave portion was formed on a surface of the first PET sheet opposite to a surface thereof, on which a reversible thermosensitive recording layer was formed, and into the concave portion, a hot melt adhesive D (the third resin layer) was applied, and that the first PET sheet was coated with the hot melt adhesive D instead of the hot melt adhesive A.

Example B-5

A reversible thermosensitive recording medium of Example B-5 was produced in the same manner as in Example B-1, except that as the electronic information recording module the electronic information recording module A was replaced with the electronic information recording module B (RKT132, produced by Hitachi, Ltd.), which had an IC package connected via soldering bump on an antenna wiring substrate.

Example B-6

A reversible thermosensitive recording medium of Example B-6 was produced in the same manner as in Example B-1, except that as the electronic information recording module the electronic information recording module A was replaced with the electronic information recording module C (RKT132, produced by Hitachi, Ltd.), in which an IC package having leads on both ends thereof was connected to an antenna circuit via soldering.

Example B-7

A reversible thermosensitive recording medium of Example B-7 was produced in the sane manner as in Example B-1, except that the hot melt adhesive A was applied in a thickness higher than the height of the antenna wiring of the electronic information recording module by 5 μm.

Comparative Example B-1

With reference to the description of JP-A No. 2008-162077, a reversible thermosensitive recording medium of Comparative Example B-1 was produced, in which an IC chip projected through a through-hole of a core sheet toward the reversible thermosensitive recording sheet.

As a base sheet, a white PET film having a thickness of 75 μm, as proof paper poem (produced by KISHU PAPER CO., LTD.) having a thickness of 130 μm, a PET film, LUMIRROR (produced by TORAY INDUSTRIES, INC.) having a thickness of 125 μm, a PET film, LUMIRROR (produced by TORAY INDUSTRIES, INC.) having a thickness of 188 μm, and a high quality paper, NIP of KISHU (produced by KISHU PAPER CO., LTD.) having a thickness of 150 μm, as a reversible thermosensitive recording sheet, a base 630BD having a thickness of 75 μm, as a adhesive layer, a double face tape (no core, adhesive: acrylic adhesive), yellow sepanonsupport (produced by Toho shiko corporation) having a thickness of 20 μm, a double face tape (core: non-woven fabric, adhesive: acrylic adhesive) #8180 (produced by DIC Corporation) having a thickness of 140 μm, were used.

Moreover, the shortest distance from the antenna circuit in the inlet to the core sheet facing the antenna circuit was adjusted to 5 μm.

Comparative Example B-2

With reference to the description of JP-A No. 2008-229911, a reversible thermosensitive recording medium of Comparative Example B-2 was produced, in which an IC chip projected through a through-hole of a core sheet toward the base sheet for the medium, in the same manner as in Comparative Example B-1.

As a base sheet for medium, a white PET film having a thickness of 75 μm, as an electronic information recording sheet, Philips I-code family, ISO15 693 (dry inlet, produced by UPM), as a core sheet, waterproof paper poem (produced by KISHU PAPER CO., LTD. including a styrene-butadiene copolymer and an acrylic copolymer) having a thickness of 150 μm, as an adhesive layer, a double face tape (no core, adhesive: acrylic adhesive), yellow sepanonsupport (produced by Toho shiko corporation) having a thickness of 20 μm were used.

Moreover, the shortest distance from the antenna circuit of the electronic information recording sheet to the core sheet facing the antenna circuit was adjusted to 5 μm.

Comparative Example B-3

With reference to the description of JP-A No. 2009-173013, a reversible thermosensitive recording medium of Comparative Example B-3 was produced, in which the reversible thermosensitive recording medium included a base sheet (CRISPER, produced by Toyobo Co., Ltd., thickness: 100 μm), and a first sheet (CRISPER, produced by Toyobo Co., Ltd., thickness: 125 μm), wherein the Philips I-code family, ISO15 693 (produced by UPM, dry inlet) as the electronic information recording sheet was fully housed in the hollowed-out portion of the first sheet.

Here, the second sheet (CRISPER, produced by Toyobo Co., Ltd., thickness: 100 μm), the third sheet (CRISPER, produced by Toyobo Co., Ltd., thickness: 75 μm), and the reversible thermosensitive recording sheet were sequentially laminated via the adhesive layer (yellow sepanonsupport (produced by Toho shiko corporation, thickness: 20 μm).

In the second sheet, a hollowed-out portion was formed, and fully housed the electronic information recording sheet.

In the first sheet, a through-hole, into which the electronic information recording element could be inserted, was formed.

Moreover, the shortest distance from the antenna circuit of the electronic information recording sheet to the base sheet facing the antenna circuit was adjusted to 5 μm.

Comparative Example B-4

With reference to the description of JP-A No. 11-11060, a reversible thermosensitive recording medium of Comparative Example B-4 was produced, in which an IC chip provided on the antenna circuit formed of an aluminum foil on the second sheet in a state where the IC chip was housed in a through-hole of the first sheet (630BD, produced by Ricoh Company, Ltd.), and the hot melt adhesive D (BOND MASTER 170-7254SB, produced by Nippon NSC Ltd.) was filled into the through-hole.

(Measuring Method and Evaluation Method)

The shortest distance, bending durability II, contact pressure resistance, color development after repetitive use, thickness, flexibility, shape recovery time, handling, and back surface roughness $R_{max}$ and adhesion tensile force were measured as follows.

<Measurement of the Shortest Distance>

The shortest distance was measured as follows: each of the reversible thermosensitive recording media of Examples B-1 to B-7, Comparative Examples B-1 to B-4, Example A-1, and Comparative Example A-1 was sliced in the thickness direction thereof in such a manner that the cross section included the wiring part including the antenna circuit, and the cross section was polished, and then the shape of the cross section was observed using a microscope (VHX-1000, produced by KEYENCE CORPORATION). The results are shown in Table 8-1.

<Bending Durability II>

The reversible thermosensitive recording media of Example B-1 to B-7 and Comparative Example B-1 to B-4, Example A-1, and Comparative Example A-1 were bended as described below, and communication distance was measured.

The communication distance was measured with a RFID reader FHT421SB2U, produced by FUJITSU LIMITED). The results are shown in Table 8-1.

Firstly, the reversible thermosensitive recording medium was bent repeatedly 1,000 times in the order of a short side of a front surface (the side of the first sheet-shaped base), a long side thereof a short side of a back surface (the side of the second sheet-shaped base), and a long side thereof, to thereby obtain the curvature radius of 25 mm.

Next, similarly, the reversible thermosensitive recording medium was bent repeatedly 1,000 times in the order of the short side of the front surface (the side of the first sheet-shaped base), the long side thereof, the short side of the back surface (the side of the second sheet-shaped base), and the long side thereof, to thereby obtain the curvature radius of 20 mm.

Moreover, the reversible thermosensitive recording medium was bent repeatedly 1,000 times in the order of the short side of the front surface (the side of the first sheet-shaped base), the long side thereof the short side of the back surface (the side of the second sheet-shaped base), and the long side thereof to thereby obtain the curvature radius of 15 mm.

Thus far, the reversible thermosensitive recording medium was bent repeatedly 3,000 times in total, and additionally, the reversible thermosensitive recording medium was bent similarly so as to obtain the curvature radius of 10 mm, and then 7.5 mm.

Here, Examples and Comparative Examples were compared with respect to the number of the bending when an electronic data of the reversible thermosensitive recording medium could not be read with a REID reader, i.e. the communication distance was 0 mm. It was evaluated that the reversible thermosensitive recording medium had sufficient bending durability, when an electronic data therein could be read after the reversible thermosensitive recording medium had been bent 3,000 times.

<Contact Pressure Resistance>

Pressure was applied on each of the reversible thermosensitive recording media of Examples B-1 to B-7 and Comparative Examples B-1 to B-4, Example A-1, and Comparative Example A-1 with an IC tag load tester IL-100, produced by JCM Co., Ltd.). An attachment having a contact surface having a dimension of 5 mm×5 mm at a tip thereof was pressed onto the area on a surface of the reversible thermosensitive recording medium where an electronic information recording module was mounted, and pressure was intensively applied onto the electronic information recording module.

The contact pressure was measured in such a manner that the contact pressure was sequentially increased from 10 kgf, and when an image could not be read with the RFID reader, i.e. the communication distance was 0 mm, the contact pressure was measured. It was evaluated that the reversible thermosensitive recording medium had sufficient contact pressure resistance, when an electronic data therein could be read upon application of the contact pressure of 100 kgf. As the RFID reader, FHT421SB2U (produced by FUJITSU LIMITED) was used. The results are shown in Table 8-1.

<Method for Measuring and Evaluating Color Development>

In an entire surface of each of the reversible thermosensitive recording media of Examples B-1 to B-7 and Comparative Examples B-1 to B-4, Example A-1, and Comparative Example A-1, a solid image was color-developed using a thermal printer RP-K (produced by SINFONIA TECHNOLOGY CO., LTD.), and the color development of a printing image was evaluated according to the following evaluation criteria. The results are shown in Table 8-1.

A: No unprinted portion was observed.

B: Less color developed portion was observed.

C: Unprinted portion was observed.

Figure 30A:
FIG. 30A is a view showing a state where no failure in color development occurs in a solid printing on the reversible thermosensitive recording layer.
Figure 30B:
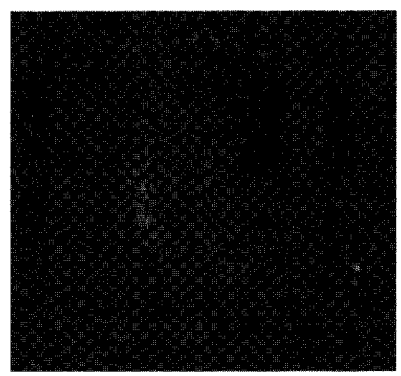
FIG. 30B is a view showing a state where some portions are less color developed in a solid printing on the reversible thermosensitive recording layer.
Figure 31:
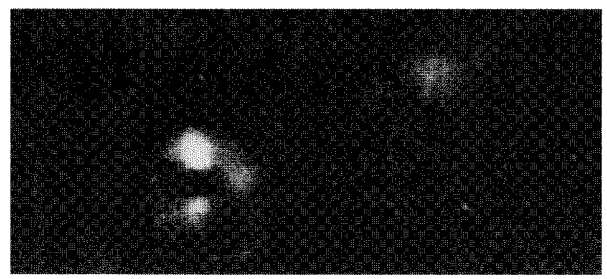
FIG. 31 is a view showing a state where failure in color development, such as white voids, image fading, etc. occurs in a solid printing on the reversible thermosensitive recording layer.

FIG. 30A shows a state of a color development in the case where the evaluation is A, i.e. no unprinted portion was observed. FIG. 30B shows a state of a color development in the case where the evaluation is B, i.e. less color developed portion was observed. FIG. 31 shows a state of a color development in the case where the evaluation is C, i.e. unprinted portion was observed.

(Thinning)

The total thickness of each of the reversible thermosensitive recording media of Examples B-1 to B-7 and Comparative Examples B-1 to B-4 was measured with an electric micrometer (K-35, produced by Anritsu Corporation). The results are shown in Table 8-2.

(Flexibility)

Figure 32:
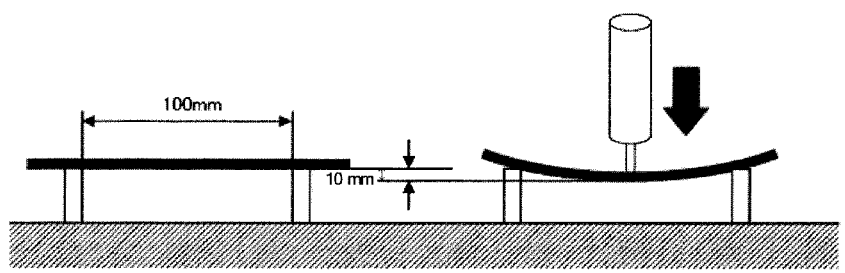
FIG. 32 is an explanatory diagram for a method of measuring flexibility of the reversible thermosensitive recording medium using a loading measurement device.

Each of the reversible thermosensitive recording media of Examples B-1 to B-7 and Comparative Examples B-1 to B-4 was bent by a three-point bend method, and the amount of deflection and load thereof were measured using a loading measurement device shown in FIG. 32. Specifically, the reversible thermosensitive recording medium was supported at two points, while the distance therebetween was 10 mm in the cross sectional view, and the reversible thermosensitive recording medium was pressed at a center point thereof. When the amount of the deflection became 10 mm the load was measured. The smaller the load was, the more flexible the thermosensitive recording medium was. The flexibility was evaluated according to the following evaluation criteria. The results are shown in Table 8-2.

<Evaluation Criteria>

A: The load was less than 45 gf.

B: The load was 45 gf or more.

TABLE 8-1

| | Shortest distanced μm | Bending durability | Contact pressure durability | Color development upon repetitive use |
|---|---|---|---|---|
| Ex. B-1 | 15 | 3,000 times or more | 100 kgf or more | A |
| Ex. B-2 | 15 | 3,000 times or more | 100 kgf or more | A |
| Ex. B-3 | 15 | 3,000 times or more | 100 kgf or more | A |
| Ex. B-4 | 15 | 3,000 times or more | 100 kgf or more | A |
| Ex. B-5 | 15 | 3,000 times or more | 100 kgf or more | A |
| Ex. B-6 | 15 | 3,000 times or more | 100 kgf or more | A |
| Comp. Ex. B-7 | 5 | 3,000 times or more | 100 kgf or more | B |
| Comp. Ex. B-1 | 5 | 3,000 times or more | 100 kgf or more | C |
| Comp. Ex. B-2 | 5 | 3,000 times or more | 100 kgf or more | C |
| Comp. Ex. B-3 | 5 | 3,000 times or more | 100 kgf or more | A |
| Comp. Ex. B-4 | 5 | 3,000 times or more | 100 kgf or more | C |
| Ex. A-1 | 15 | 3,000 times or more | 100 kgf or more | A |
| Comp. Ex. A-1 | 5 | 3,000 times or more | 100 kgf or more | C |

TABLE 8-2

|  | Thinning mm | Flexibility gf |
|---|---|---|
| Ex. B-1 | 0.385 | 30 (A) |
| Ex. B-2 | 0.385 | 30 (A) |
| Ex. B-3 | 0.385 | 30 (A) |
| Ex. B-4 | 0.385 | 30 (A) |
| Ex. B-5 | 0.425 | 42 (A) |
| Ex. B-6 | 0.425 | 42 (A) |
| Ex. B-7 | 0.375 | 30 (A) |
| Comp. Ex. B-1 | 0.450 | 50 (B) |
| Comp. Ex. B-2 | 0.450 | 50 (B) |
| Comp. Ex. B-3 | 0.540 | 150 (B) |
| Comp. Ex. B-4 | 0.270 | 30 (A) |

(Evaluation of Shape Recovery Time)

The shape recovery times of the reversible thermosensitive recording media of Examples B-1 to B-7 and Comparative Examples B-1 to B-4 were evaluated in the same manner as in those of Example A-1 and Comparative Example A-1.

TABLE 9

| | Shape recovering time (s) | |
|---|---|---|
| | The case where a reversible thermosensitive recording layer was folded upward. | The case where a reversible thermosensitive recording layer was folded downward. |
| Example B-1 | 1 | 15 |
| Example B-2 | 1 | 15 |
| Example B-3 | 1 | 15 |
| Example B-4 | 1 | 15 |
| Example B-5 | 1 | 25 |
| Example B-6 | 1 | 25 |
| Example B-7 | 1 | 15 |
| Comparative Example B-1 | 1 | 25 |
| Comparative Example B-2 | 1 | 25 |
| Comparative Example B-3 | 300 | 420 |
| Comparative Example B-4 | 1 | 8 |

(Evaluation of Handling)

The press forces of the reversible thermosensitive recording media of Examples B-1 to B-7 and Comparative Examples B-1 to B-4 were measured and then handlings thereof were evaluated in the same manner as in those of Example A-1 and Comparative Example A-1. The results are shown in Table 10.

TABLE 10

| | Press force (gf) |
|---|---|
| Example B-1 | 350 |
| Example B-2 | 350 |
| Example B-3 | 350 |
| Example B-4 | 350 |
| Example B-5 | 470 |
| Example B-6 | 470 |
| Example B-7 | 320 |
| Comparative Example B-1 | 560 |
| Comparative Example B-2 | 560 |
| Comparative Example B-3 | 3,100 |
| Comparative Example B-4 | 120 |

(Back Surface Roughness $R_{max}$ and Adhesion Tensile Force)

The back surface roughness $R_{max}$ and adhesion tensile force of the reversible thermosensitive recording media of Examples B-1 to B-7 and Comparative Examples B-1 to B-4 were evaluated in the same manner as in those of Example A-1 and Comparative Example A-1. The results are shown in Table 11.

TABLE 11

| | Back surface roughness Rmax (μm) | adhesion tensile force (N) |
|---|---|---|
| Example B-1 | 3.5 | 11.0 |
| Example B-2 | 3.5 | 11.0 |
| Example B-3 | 3.5 | 11.0 |
| Example B-4 | 3.5 | 11.0 |
| Example B-5 | 3.5 | 11.0 |
| Example B-6 | 3.5 | 11.0 |
| Example B-7 | 3.5 | 11.0 |
| Comparative Example B-1 | 3.5 | 11.0 |
| Comparative Example B-2 | 3.5 | 11.0 |
| Comparative Example B-3 | 3.5 | 11.0 |
| Comparative Example B-4 | 3.5 | 11.0 |
| Comparative Example B-5 | 3.5 | 11.0 |

The reversible thermosensitive recording medium of the present invention is excellent in printing quality, bending durability and handling, and can recover its shape at high speed, thus can be widely used, as a reversible thermosensitive recording medium having an electronic information recording module (IC chip), for example, as gateway tickets and as stickers for frozen food containers, industrial products, drug containers, in logistics, process management and document management.

Moreover, the reversible thermosensitive recording medium of the present invention is thin and has excellent flexibility without breaking the electronic information recording module, causes neither failure in color development after repetitive image formation and erasure nor initial failure in color development upon performing image formation once, and thus can be widely used, as a reversible thermosensitive recording medium having an electronic information recording module (IC chip), for example, as gateway tickets and as stickers for frozen food containers, industrial products, drug containers, in logistics, process management and document management.

What is claimed is:

1. A reversible thermosensitive recording medium comprising:
a reversible thermosensitive recording layer;
a first sheet-shaped base provided adjacent to the reversible thermosensitive recording layer;
an electronic information recording module containing a module substrate, and a convex-shaped electronic information recording element and an antenna circuit both disposed on the module substrate; and
a first resin layer for bonding the first sheet-shaped base and the electronic information recording module,
wherein the first sheet-shaped base has a concave portion on a surface opposite to a surface on which the reversible thermosensitive recording layer is formed, and the electronic information recording element is inserted into the concave portion of the first sheet-shaped base,
wherein the first resin layer bonding the first sheet-shaped base and the electronic information recording module is uniformly flat to cover the antenna circuit, and
said first resin layer covers the entire surface of the electronic information recording module which is opposite to a surface of the electronic information recording module on which the electronic information recording element is provided, and wherein the reversible thermosensitive recording medium has a uniform thickness.

2. The reversible thermosensitive recording medium according to claim 1, wherein in the width direction of the concave portion the distance between a side surface of the concave portion and a side surface of the electronic information recording element is 6.0 mm or less.

3. The reversible thermosensitive recording medium according to claim 1, wherein in the depth direction of the concave portion the distance between the bottom of the concave portion and the top of the electronic information recording element is 0 μm to 50 μm.

4. The reversible thermosensitive recording medium according to claim 1, further comprising one or more functional layers provided on a side of the reversible thermosensitive recording medium opposite to the side where the reversible thermosensitive recording layer is provided, via the first sheet-shaped base and the first resin layer.

5. The reversible thermosensitive recording medium according to claim 1, further comprising:
a second sheet-shaped base provided on a surface of the reversible thermosensitive recording medium opposite to a surface thereof on which the reversible thermosensitive recording layer of the first sheet-shaped base is formed; and
a second resin layer for bonding the second sheet-shaped base and the first sheet-shaped base,
wherein the electronic information recording module is provided between the first sheet-shaped base and the second sheet-shaped base,
wherein the electronic information recording element is inserted into the concave portion of the first sheet-shaped base so as to leave a gap between the electronic information recording element and the concave portion of the first sheet-shaped base in the depth direction of the concave portion, and
wherein the first resin layer is provided so as to adjust the shortest distance between the antenna circuit and the first sheet-shaped base to 10 μm or more.

6. The reversible thermosensitive recording medium according to claim 5, wherein the first resin layer has an elastic modulus larger than that of the second resin layer.

7. The reversible thermosensitive recording medium according to claim 1, wherein the first resin layer has a thickness of 100 μm or less.

8. The reversible thermosensitive recording medium according to claim 1, further comprising another resin layer formed in a gap between the concave portion and the electronic information recording element.

9. The reversible thermosensitive recording medium according to claim 8, wherein the material for forming the first resin layer and the material for forming said another resin layer are the same resin.

10. The reversible thermosensitive recording medium according to claim 8, wherein said another resin layer has an elastic modulus smaller than that of the first sheet-shaped base.

11. The reversible thermosensitive recording medium according to claim 8, wherein the elastic modulus of said another resin layer is 700 MPa to 1,500 MPa.

12. The reversible thermosensitive recording medium according to claim 1, wherein the first resin layer is applied for bonding at a temperature of 60° C. to 90° C., and a viscosity of $1 \times 10^5$ CPS or less.

13. The reversible thermosensitive recording medium according to claim 1, wherein the concave portion has a depth of 150 μm or less, and in the width direction of the concave portion the distance between a side surface of the concave portion and a side surface of the electronic information recording element is 1.5 mm or less.

14. The reversible thermosensitive recording medium according to claim 1, wherein the concave portion has a depth of 110 μm or less, and in the width direction of the concave portion the distance between a side surface of the concave portion and a side surface of the electronic information recording element is 6.0 mm or less.

15. The reversible thermosensitive recording medium according to claim 1, wherein the reversible thermosensitive recording medium has a load for bending deformation of 28 gf or less, where the load for bending deformation indicates flexibility of the reversible thermosensitive recording medium.

16. A method for producing a reversible thermosensitive recording medium, comprising:
(a) forming a reversible thermosensitive recording layer on a surface of a first sheet-shaped base;
(b) forming a concave portion on a surface of the first sheet-shaped base opposite to the surface thereof on which the reversible thermosensitive recording layer is formed,
(c) forming a first resin layer on the surface of the first sheet-shaped base on which the concave portion is formed; and
(d) bonding the first sheet-shaped base and an electronic information recording module containing a module substrate, and a convex-shaped electronic information recording element and an antenna circuit both disposed on the module substrate, via the first resin layer, with the electronic information recording element being inserted into the concave portion,
wherein the first resin layer applied for bonding the first sheet-shaped base and the electronic information recording module in (d) is uniformly flat to cover the antenna circuit, and
said first resin layer covers the entire surface of the electronic information recording module which is opposite to a surface of the electronic information recording module on which the electronic information recording element is provided, and
wherein the reversible thermosensitive recording medium has a uniform thickness.

17. The method for producing a reversible thermosensitive recording medium according to claim 16, wherein the forming a first resin layer comprises adjusting the shortest distance between the antenna circuit and the first sheet-shaped base to 10 μm or more, and the boding the first sheet-shaped base and an electronic information recording module comprises inserting the electronic information recording element into the concave portion so as to leave a gap between the electronic information recording element and the concave portion of the first sheet-shaped base in the depth direction of the concave portion, and
wherein the method further comprises:
forming a second resin layer on a surface of a second sheet-shaped base; and
bonding the second sheet-shaped base to the first sheet-shaped base and the electronic information recording module via the second resin layer.

18. The method for producing the reversible thermosensitive recording medium according to claim 17, wherein the material for forming the first resin layer and the material for forming the second resin layer are the same resin.

19. The method for producing the reversible thermosensitive recording medium according to claim 16, wherein the boding the first sheet-shaped base and an electronic information recording module comprises forming another resin layer in the concave portion so as to bond the concave portion and the electronic information recording element to be inserted thereinto via the third resin layer.

20. The method for producing the reversible thermosensitive recording medium according to claim 19, wherein the material for forming the first resin layer and the material for forming said another resin layer are the same resin.

* * * * *